United States Patent [19]
Long et al.

[11] Patent Number: 5,961,196
[45] Date of Patent: Oct. 5, 1999

[54] FLASH DEVICE FOR DYE TRANSFERRING

[75] Inventors: Michael Edgar Long, Bloomfield; Carl Frederick Leidig, Rochester, both of N.Y.

[73] Assignee: Eastman Kodak Company, Rochester, N.Y.

[21] Appl. No.: 08/686,906

[22] Filed: Jul. 26, 1996

[51] Int. Cl.[6] .................................................. G03B 15/02
[52] U.S. Cl. ......................... 362/17; 362/297; 362/224; 362/3
[58] Field of Search .................................. 362/3, 16, 17, 362/18, 296, 297, 347, 223, 286, 289, 290, 222, 224, 307, 342, 343, 354; 430/7, 321

[56] References Cited

U.S. PATENT DOCUMENTS

| | | | |
|---|---|---|---|
| 4,081,277 | 3/1978 | Brault et al. ............................. | 96/38.2 |
| 4,923,860 | 5/1990 | Simons ................................... | 503/227 |
| 4,991,063 | 2/1991 | Stoneham ................................ | 362/18 |
| 5,055,976 | 10/1991 | Arai ........................................ | 362/17 |
| 5,136,491 | 8/1992 | Kano ...................................... | 362/347 |
| 5,160,192 | 11/1992 | Hasushita et al. ...................... | 362/18 |
| 5,229,232 | 7/1993 | Longobardi et al. ................... | 430/7 |
| 5,309,329 | 5/1994 | Thiel et al. ............................. | 362/17 |
| 5,394,307 | 2/1995 | Matsuura ................................ | 362/16 |
| 5,408,363 | 4/1995 | Kano ...................................... | 362/347 |
| 5,438,379 | 8/1995 | Kurematsu .............................. | 362/296 |
| 5,535,054 | 7/1996 | Shibuya .................................. | 362/296 |
| 5,584,572 | 12/1996 | Ishikawa ................................. | 362/297 |
| 5,586,013 | 12/1996 | Winston et al. ........................ | 362/347 |
| 5,617,163 | 4/1997 | Ohtake ................................... | 362/16 |
| 5,641,218 | 6/1997 | Sakurai .................................. | 362/16 |

*Primary Examiner*—Laura Tso
*Attorney, Agent, or Firm*—Svetlana Z. Short

[57] ABSTRACT

A flash device includes a micro-optic array for concentrating light from the flash lamp on a radiation-absorbing dye carrier, thereby sublimating or vaporizing the dye from the radiation-absorbing dye carrier onto a receiver element, e.g. a glass plate or the like.

8 Claims, 10 Drawing Sheets

FLASH DEVICE FOR DYE TRANSFERRING

CROSS REFERENCE TO RELATED APPLICATION

This application relates to U.S. patent application Ser. No. 08/686,903, filed Jul. 26, 1996, entitled A REFLECTOR AND A REFLECTOR/LIGHT SOURCE SYSTEM, by Carl F. Leidig.

BACKGROUND OF THE INVENTION

1. Field of the Invention

The present invention relates to a flash device, preferably for transferring dye particles by means of high-energy light flash and a micro-optic focusing array, from a radiation-absorbing dye carrier onto a receiver element, e.g. a glass plate or the like.

2. Background

Liquid crystal display devices are known for digital display in electronic calculators, clocks, household appliances, audio equipment, etc. Liquid crystal display devices are being developed to replace cathode ray tube technology for display terminals because they occupy smaller volume than cathode ray tube devices, are lighter than cathode ray tube devices occupying the same screen area and, have lower power and voltage requirements than corresponding cathode ray tube devices.

A liquid crystal display requires a color filter array (CFA) as one of its components. One commercially available type of a color filter array that has been used in liquid crystal display devices is a transparent support having a polymer receiver layer (such as a gelatin layer) thereon which contains red, blue and green dyes arranged in a mosaic pattern obtained by a photolithographic process. The photolithographic process involves a large number of steps. These steps include cleaning the support, coating it, exposing it to light and then developing it, drying it, etching it and stripping it for each of the three dye colors. Details of this process are disclosed in U.S. Pat. No. 5,229,232 (background section) and U.S. Pat. No. 4,081,277. Because of the large number of steps involved in the photolithographic process, such color filter arrays are relatively expensive to manufacture. In addition, misalignment or improper deposition of color materials may occur during this process, reducing the quality of the color filter array.

One promising method to reduce the cost of color filter array manufacture is a thermal dye transfer method described in U.S. Pat. No. 4,923,860, U.S. Pat. No. 5,229,232 and U.S. Pat. No. 5,309,329. In the method described therein, the color filter array is formed in a relatively few steps by thermally transferring a dye from a radiation absorbing dye donor to a receiver element.

More specifically, the embodiment described in U.S. Pat. No. 5,309,329 uses a non-photolithographic contact printing method. The method disclosed in this patent utilizes a powerful plasma discharge tube to produce a high-energy flash. The light resulted from this flash is then transferred through a mask to an adjacent radiation absorbing dye carrier (also refereed to as dye donor), from which the dye sublimates onto an adjacent receiver element.

It is the principal object of the present invention to improve the above-describe thermal dye transfer method by providing a more energy efficient flash device.

Another object of the present invention is to create an improved flash device that eliminates the problem of mask abrasion, which occurs in contact printing methods that use masks.

SUMMARY OF THE INVENTION

Briefly described, according to one aspect of the present invention, a flash device for directing a high energy flash for transferring dye from a radiation-absorbing dye carrier to a receiver element includes: a flash lamp providing a high energy flash of light; a reflector directing the light towards the receiver element; a support means for supporting the radiation-absorbing dye carrier between the reflector and receiver element; and a micro-optics array. The micro-optics array is located between the reflector and the dye carrier. It concentrates the light directed by the reflector on the dye carrier.

According to a preferred embodiment of the present invention, a method of producing a color filter array by transferring dye patterns from a radiation-absorbing dye carrier onto a receiver element, includes the steps of: producing a high-energy flash of light; directing the light towards the receiver element; and focusing this directed light into a pattern of high energy on a plane located in a vicinity of the radiation-absorbing dye carrier. This heats the dye-carrier according to the pattern and transfers the dye onto the receiver element. According to one of the embodiments of the present invention the pattern is a pattern of spots. According to another embodiment of the present invention this pattern is a pattern of lines.

One of advantages of the present invention is that the flash device is more energy efficient than other similar flash devices.

Another advantage that of the present invention is that an improved color filter, manufactured according to the present invention, does not exhibit a soft shadow edge pattern associated with non-imaging proximity printing methods of manufacture that use masks.

Another advantage of the present invention is that it eliminates the problem of mask abrasion, that occurs in contact printing methods that use masks.

BRIEF DESCRIPTION OF THE DRAWINGS

The foregoing and other objects, features and advantages as well as the presently preferred embodiment thereof will become more apparent from reading of the following description in connection with the accompanying drawings.

DESCRIPTION OF THE PREFERRED EMBODIMENT

Figure 1A:
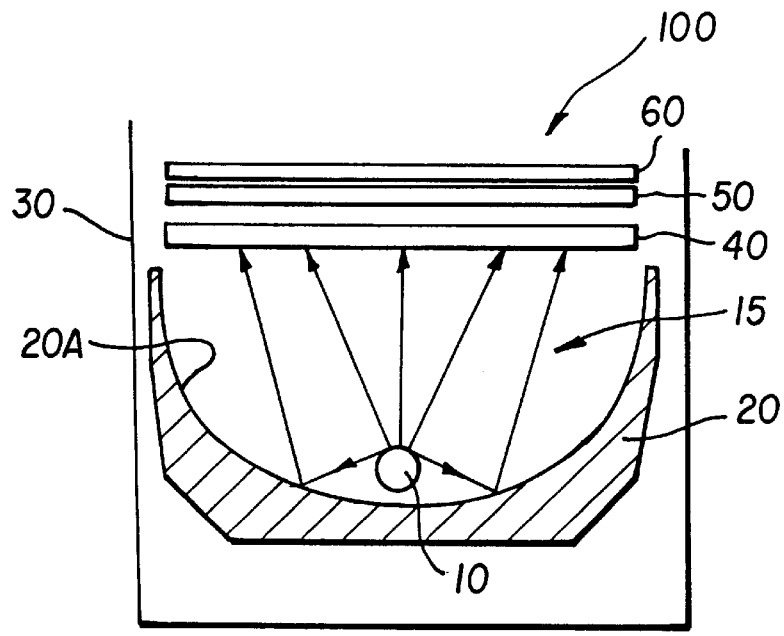
FIG. 1A shows schematically a relative movement of the receiver element 60 with respect to the flash device 100 via the use of a positioning system 70.
Figure 1B:
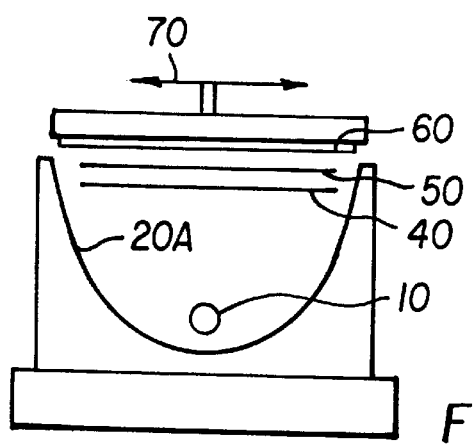
FIG. 1B shows schematically a greatly exaggerated movement of the flash device 100 via the use of a positioning system 70.
Figure 1C:
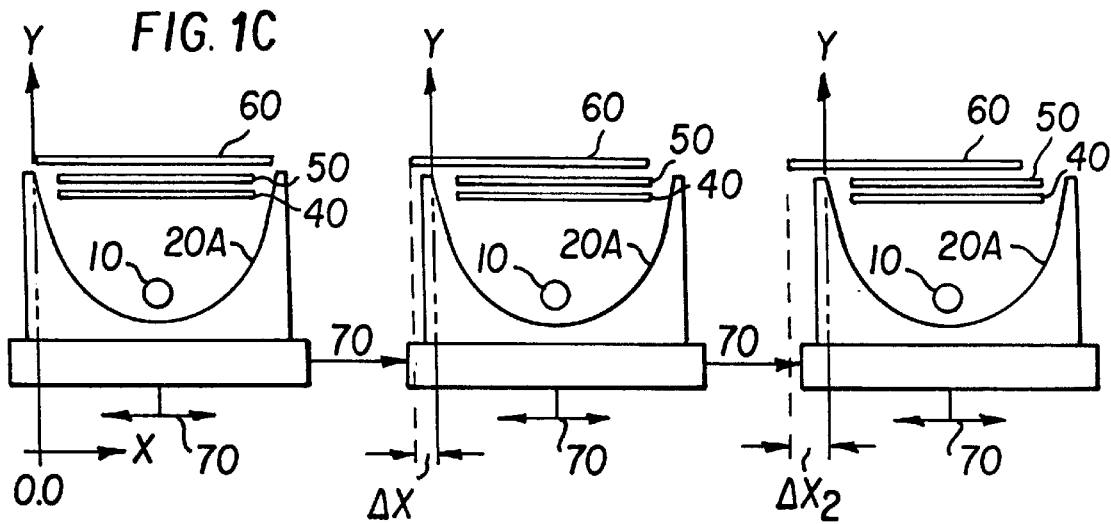
FIG. 1 shows a schematic cross-section of the flash device 100.

With reference to the accompanying FIG. 1 a flash device 100 comprises a high energy source such as a flash lamp 10 and a reflector 20, both located within a casing body 30. The reflector 20 directs the light energy (schematically depicted as light rays 15) flashed by the flash lamp 10 towards a micro-optics array 40. This micro-optics array 40 focuses the light, and as a result produces concentrations of energy 55 on or in the vicinity of a dye carrier 50 which includes a radiation absorbing dye layer. The dye carrier 50 is supported in its location by a support structure 51. This is shown schematically in FIG. 2. These concentrations of energy cause the dye to transfer from the radiation-absorbing dye carrier 50 to the receiver element 60. The flash device, such as the device 100, may also include other conventional features associated with known flash devices including those used in production of color filter arrays.

According to the preferred embodiment, the flash lamp 10 delivers approximately a minimum of 0.5–1.5 joules of radiant energy per flash in approximately 600–700 milliseconds. This radiant energy is visible, near UV (ultra violet) and near IR (infra-red) light. The example illustrated in FIG. 1 utilizes a six inch long xenon tube flash lamp such as the one described by the tube number N.188c, which is commercially available from Xenon Corporation (Woburn, Mass). Similar flash lamps are also available from other manufacturers, for example, EG&G Electro Optics (Salem, Mass.).

As stated above the reflector 20 directs the light from the flash lamp 10 towards the micro-optics array 40 which is being used instead of a mask. In this embodiment the reflector 20 has a reflective, curved (roughly cylindrical) inner walls 20A which are polished aluminum. However, other highly reflective materials may also be used. According to one example of the reflector 20 of the present invention the inner walls 20A have the improved egg-like shaped cross-section 24 depicted in FIG. 5B. This shape provides a uniform (within 10%) illumination of a micro-optics array 40. This cross-section shape is further described in the "The Reflector Shape" section of this application.

Figure 5:
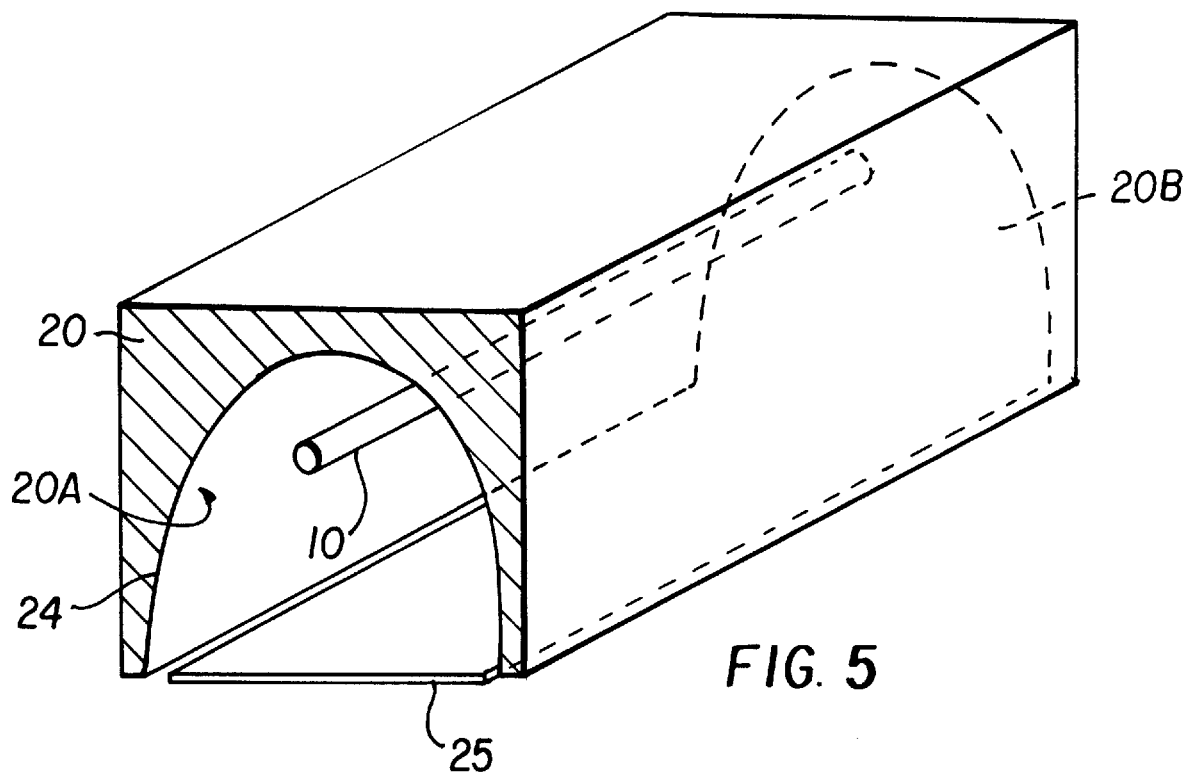
FIGS. 5A is a perspective view of the reflector 20 of the flash device shown in FIG. 1.
FIGS. 5B illustrates the cross-sectional shape of the curved reflector wall 20A of the reflector 20 shown in FIG. 5A.
Figure 5B:
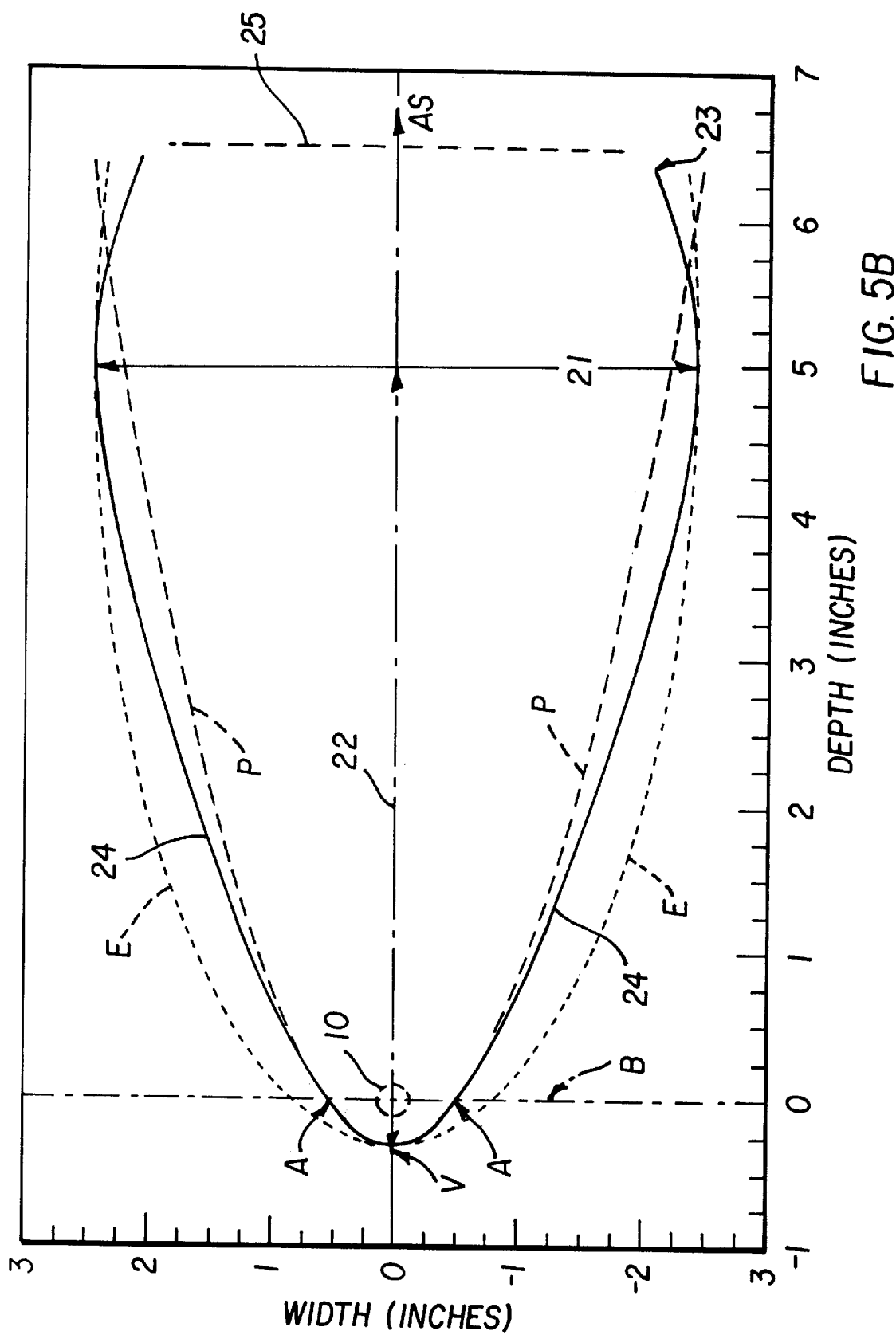
Figure 6A:
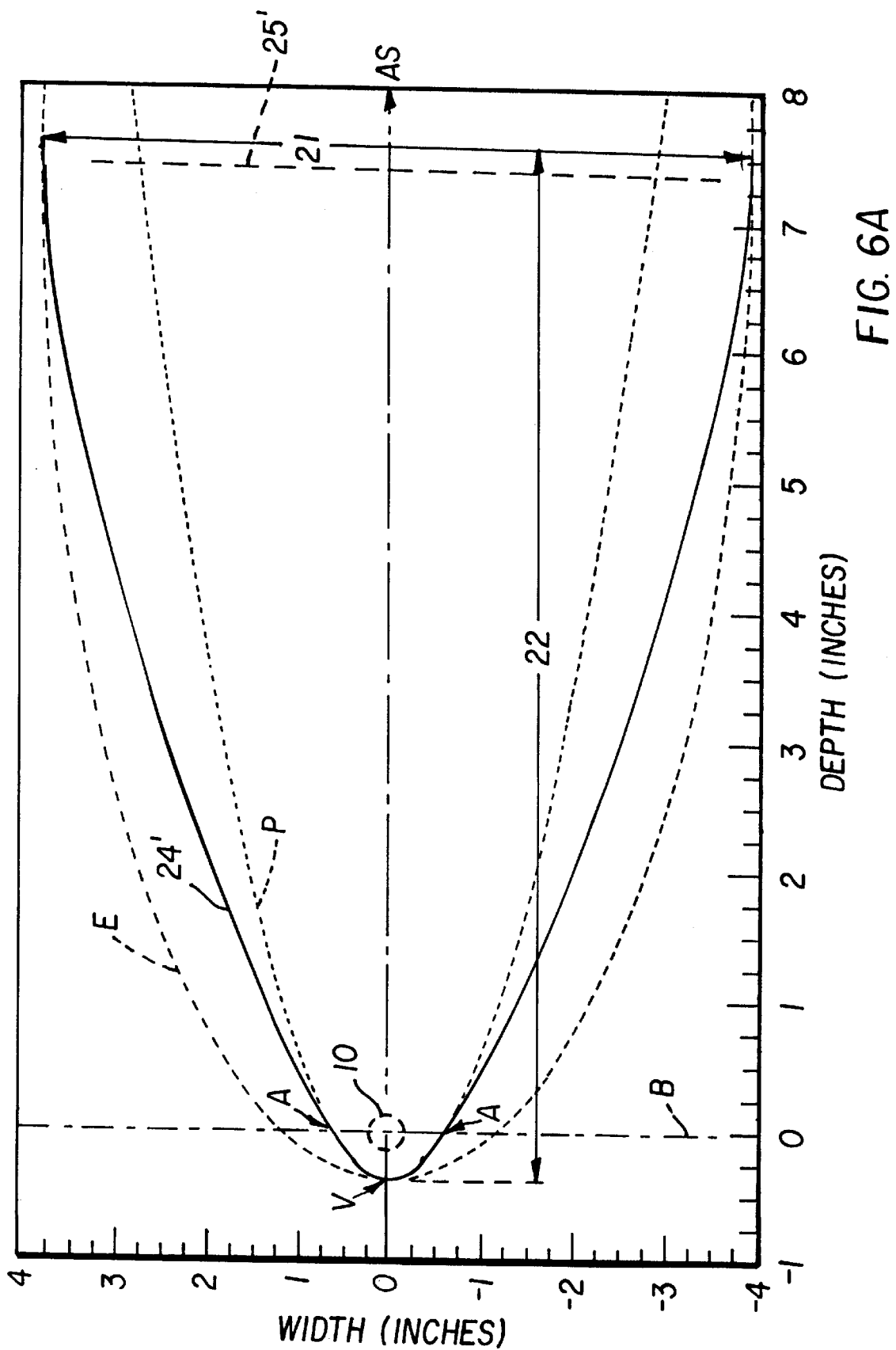
FIG. 6 illustrates an alternative cross-sectional shape of the curved reflector wall.
FIG. 6B illustrates another cross-sectional shape of the curved reflector wall.

According to another reflector example, the reflector 20 has inner walls 20A with the improved cross-section 24' depicted in FIG. 6. This shape provides even higher illumination uniformity than that of FIG. 5B. This alternative cross-sectional shape is also described in the "The Reflector Shape" section of this application.

A micro-optics array is an integral array of very small optical elements which are commonly supported. It is preferred that each of these small optical elements have a clear aperture that is smaller than about 1 mm. It is even more preferred that these clear aperture be smaller than 0.5 mm.

Figure 2:
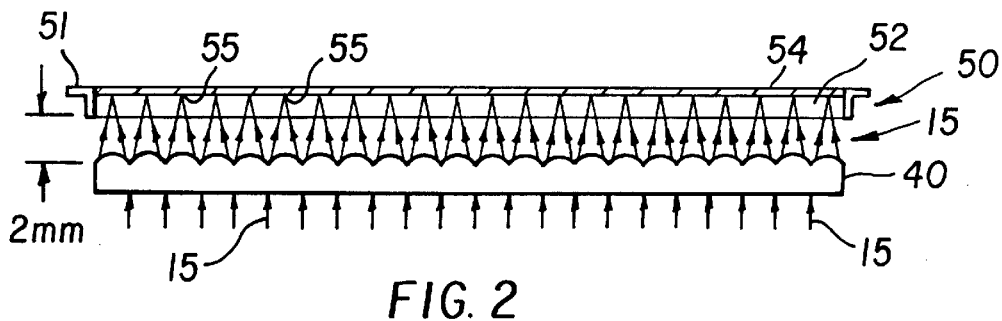
FIG. 2 shows a schematic cross-section of a part of a micro-optics array 40 of FIG. 1 imaging on a dye carrier 50.
Figure 4:
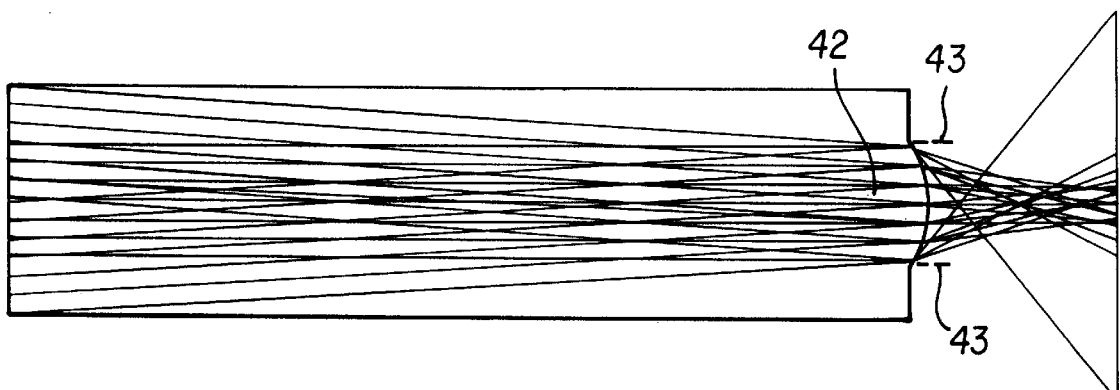
FIG. 4 shows an enlarged view of a lens element 42 of the micro-optics array illustrated in FIG. 2.
Figure 3:
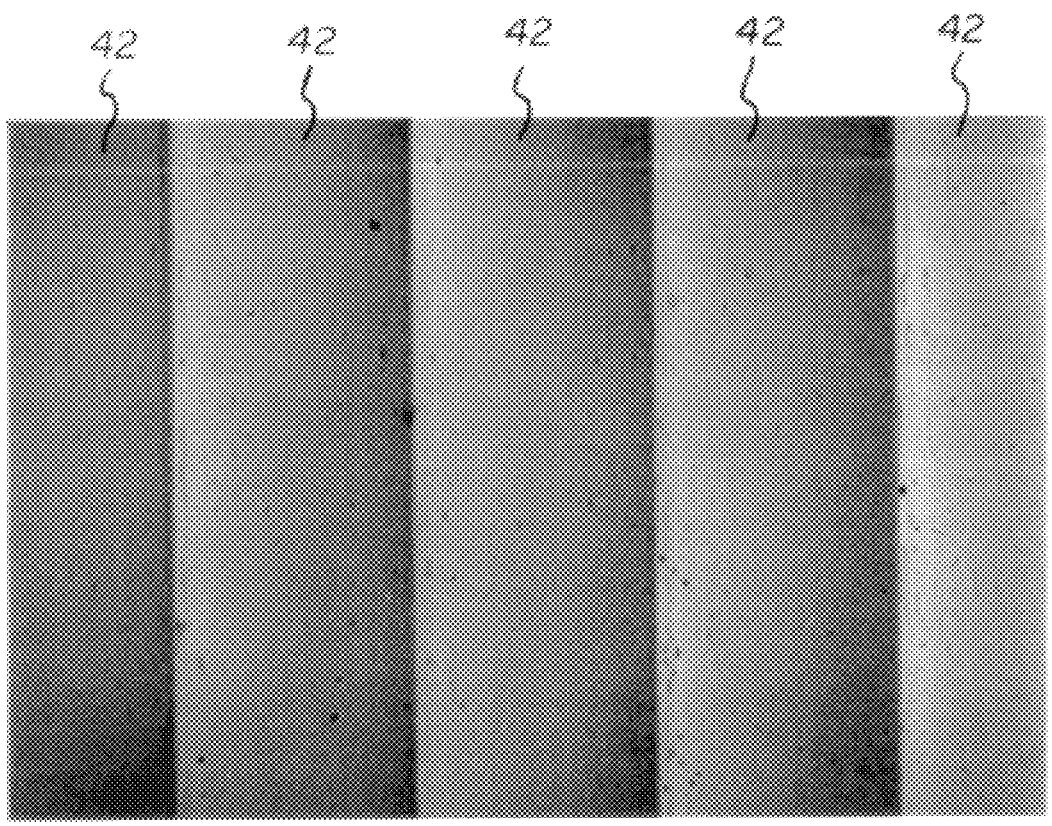
FIG. 3 shows an enlarged photograph of a part of a lenticular lenslet array can be used as the micro-optic array 40.

According to the illustrative embodiment of the present invention, the micro-optics array 40 is a lenslet array. This array is illustrated in FIGS. 2 and 3. More specifically, it is an array of very small refractive lens elements 42. Each of these lens elements have a clear aperture 43 of about 180 μm. Each of these lens elements focuses the light onto or near the dye holding layer 50, thereby concentrating light energy into a plurality of areas, spots or lines, on the layer 50. The focal points for the lens elements define a plane either coextensive with, or in the vicinity of, the dye carrier.

FIG. 3 shows that in this embodiment the microoptics array 40 is a lenticular lenslet array—i.e., that lens elements 42 are roughly cylindrical. This lenticular lenslet array has a pitch of approximately 180 microns.

If there is a need to create concentrations of energy 55 in a form of discrete spots rather than lines, the lens elements may have other shapes (such as circular, rectangular or hexagonal, for example). It is also contemplated that if a lenslet array is used, it may be an array of either diffractive lens elements or an array of lens elements having both a refractive power and a diffractive power. The use of other types of micro-optics arrays is also contemplated by this invention.

The use of the micro-optics array eliminates the need for a mask in the flash device systems as well as the problems associated with mask use. For example, while the opaque portion of a mask absorbs about ½ energy incident on the mask, the micro-optics array redistributes most of the total energy incident on it, making the thermal dye transfer method much more energy efficient. In addition, because no mask is required, the problem of mask abrasion, which is sometimes occurs because the mask is located close to the radiation-absorbing dye carrier, is also eliminated.

As stated above, the micro-optics array 40 is located near the radiation-absorbing dye carrier 50. In a particular embodiment of the invention, the separation between the micro-optic array 40 and the dye carrier 50 is approximately 0.2 millimeter. In this embodiment the dye carrier 50 comprises a support layer 52 which is approximately 0.001–0.005 inches thick and a dye holding layer 54. The dye holding layer 54 is a carbon film layer containing a dye. It is preferred that the micro-optic array 40 focus the light directly on this dye holding layer 54.

The receiver element 60 is positioned behind the dye carrier 50. The receiver element 60 is usually formed of glass or an optical quality plastic and has a polymer image receiving layer.

As stated above, the light resulted from the light flash is focused and thus is concentrated according to a predetermined pattern (into spots or lines, for example) by the micro-optics array near or on the dye carrier 50 and more preferable on the dye holding layer 54. This heats the dye holding layer 54 and causes the dye to sublime onto a receiver element 60. (If the dye holding layer 54 is a carbon film layer, the carbon can be heated (by the flash lamps discussed above) almost instantaneously to about 200–300 degrees Fahrenheit). The dye sublimes and then immediately deposits on an aligned portion of the receiver element.

In an embodiment of the present invention, the repeating mosaic pattern of colorant to form the color filter array consists of uniform repeated areas as follows:

B R G B R G B R G
B R G B R G B R G
B R G B R G B R G
B R G B R G B R G
B R G B R G B R G where B stands for the blue, R for the red and G for the green color. The width of the lines is approximately 50 to 200 microns (0.002"–0.008"). Because typical color filter arrays have a pattern of 3 colors, the above described flash device will probably be used three times—i.e. the thermal transfer will be done once for each color that needs to be deposited on the receiver element. To achieve this transfer, a new dye carrier will be substituted for the one that was previously used (the one that contains a different color dye) and a flash lamp will be activated to provide the energy needed to transfer the dye to the receiver element.

Each color dye has to be fused to the receiver element. This can be done by various well known methods, such as by heat, or by solvent fusing and subsequent baking, for example.

In order to align different color stripes on the receiver element either the lenslet array and/or the receiving element needs to be moved by an appropriate distance. This is done if one does not want to overlap different color dyes on the receiver element. It is preferred that the receiver element 60 be moved with respect to the micro-optics array or with respect to the whole flash device before depositing a dye of a different color on the receiving element. In order to deposit three different color dyes, this movement will have to be accomplished at least two times. Thus, the preferred embodiment of the present invention also incorporates a positioning system 70. Suitable positioning systems for microfabrication are well known. Prior to transferring an additional color dye onto the receiver element, the positioning system 70 positions and holds the receiver element 60 in a different position from its previous position. (See FIG. 1A.) Alternatively, a flash device 100 may be moved relative to the receiver element, (by a distance Δx, Δx 2) as shown in FIG. 1B. The positioning system 70 is indicated by arrows in FIGS. 1A and 1B. The positioning system may be used to reposition and hold the micro-optic array instead of repositioning either the receiver element or the entire flash device.

Once all color dyes are in place, an overcoat layer may be applied to the resultant filter array.

The Reflector Shape

Figure 5A:
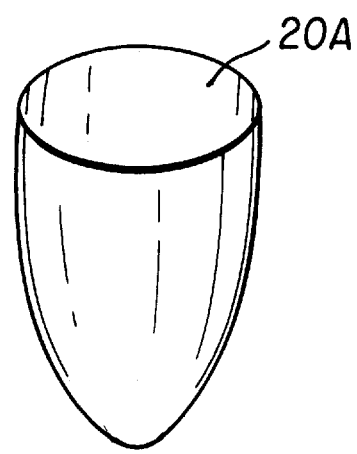

FIG. 5A shows a perspective view of the reflector 20 and the flash lamp 10. As stated above, the reflector 20 has curved inner walls 20A with an improved cross-section 24. In the preferred embodiment of the invention, walls 20A are roughly cylindrical, as shown in FIG. 5A. The reflector 20 is also bounded by reflective side walls 20B which redirect the intercepted light (coming directly from the flash lamp 10 as well as reflected by the curved walls 20A) towards the transfer plane 25.

FIG. 5B shows a cross sectional view of the curved inner walls 20A of the reflector 20. The shape of the egg-like cross section 24 may be described as (1) partially contained within the area of the ellipse E and a parabola P (up to just beyond the widest part of the reflector). The ellipse is defined by setting the minor axis of the ellipse equal to the maximum width 21 between the reflector inner walls 20A and setting the semi-major ellipse axis equal to the reflector's vertex-to maximum width distance 22. The parabola P is defined by the curve passing through the vertex point of the reflector and points A. Points A are defined by the plane's B intersection with the inner wall surface 20A. (Plane B is perpendicular to the reflector's axis of symmetry AS and intersects the center of the flash lamp 10.) The reflector's opening 23 is smaller than its maximum width 21.

The reflector/flash lamp combination of the preferred embodiment described herein achieves a substantially uniform (less than 10% variation) illumination on the transfer plane 25 of approximately 2"×2" located close to the reflector's opening 23. Table 2 tabulates the intensity distribution across this plane 25, with the plane 25 being divided into 50 section (a 10×5 matrix of sections of equal area). This intensity distribution is normalized, with the intensity having a value of 100 at the center of the transfer plane 25 (indicated in Table 2 by the dark area at the center of the table).

The specific coordinates of some 600 points defining the reflector surface are provided in Table 1. The center of the flash lamp 10 defines the X=0.0, Y=0.0 point, as shown in FIG. 5C.

FIG. 6 shows a cross-sectional view of an alternative reflector shape. The improved cross-section 24' provides substantially uniform (less than 5% variation) illumination on a transfer plane 25' of approximately 6"×6" located close to the reflector opening 23.

The shape of this cross-section 24' may also be described as being (1) partially contained within the value of the ellipse E defined by setting minor axis of the ellipse equal to the maximum width 21 of the reflector and setting the semi-major ellipse axis equal to the reflector's vertex-to maximum width distance 22; and (2) broader than a parabola P (up to just beyond the widest part of the reflector's inner wall 20A) defined by the setting of the parabola's vertex point onto the vertex point of the reflector inner wall surface and also points A, as previously defined.

The specific coordinates of some 600 points defining the reflector surface are provided in Table 3. The center of the flash lamp 10 defines the X=0.0, Y=0.0 point, as shown in FIG. 6.

Table 4 tabulates the intensity distribution across the transfer plane 25', with the transfer plane 25' being divided into a plurality of sections (18 vertical and 11 horizontal). This intensity distribution is normalized, with the intensity having a value of 100 at the center of the plane 25'.

It is noted that the intensity values of Tables 2 and 4 do not account for either the rays reflected off the reflector side walls 20B, nor for the secondary reflections. Therefore the tabulated values at the extreme left and right columns of these tables are expected to be smaller than the actual intensity values produced at the edges of transfer planes 25 and 25'. Thus, the actual illumination of the transfer plane is expected to be more uniform than what is indicated by the values of Tables 2 and 4.

Figure 6B:
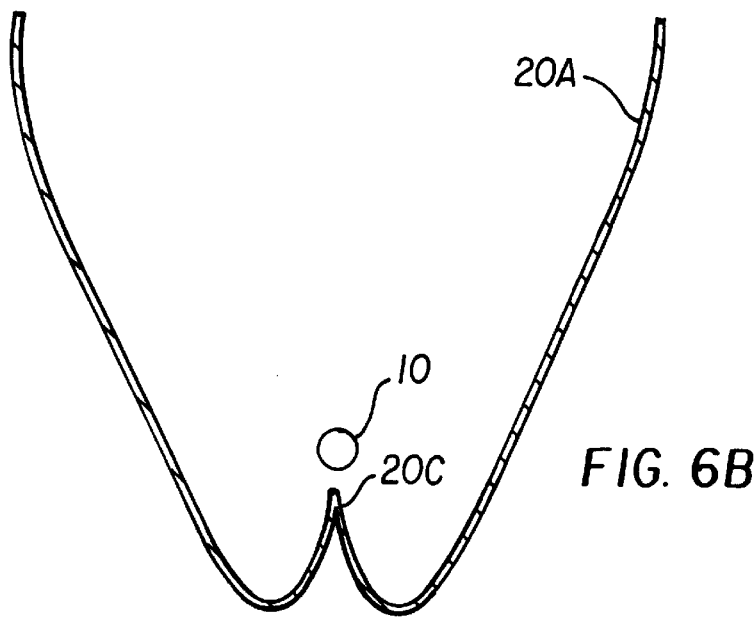

It is contemplated that some other reflector shapes may have curved inner walls 20A with a cusp 20C as shown in FIG. 6B. Such cross-sections, as well as both of the above described cross sections 24 and 24' can be described relative to their effect on the reflected light rays. That is, they may be defined by how the light rays incident on the reflective curved inner walls 20A are being directed, upon reflection, towards the transfer plane 25, 25'. This description is provided below.

Figure 7:
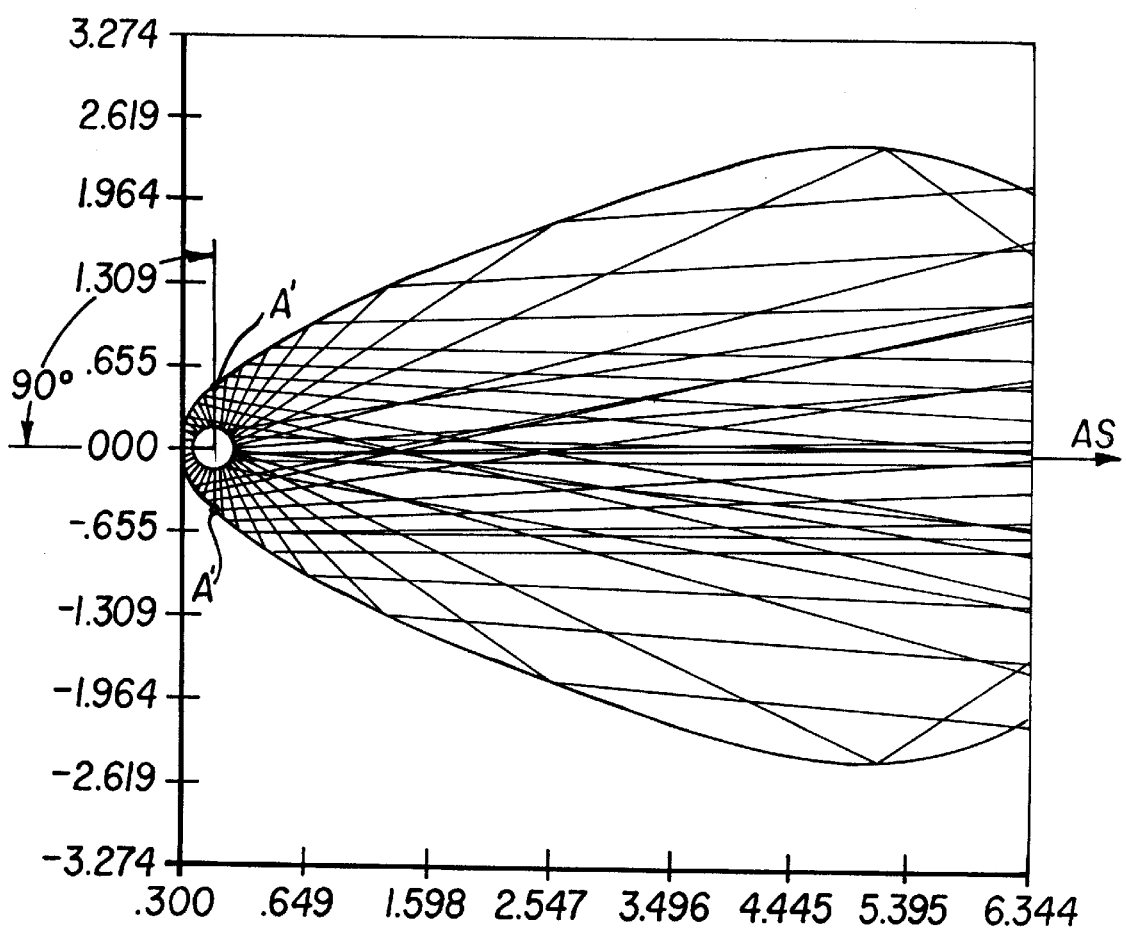
FIG. 7 depicts the light rays reflected by the curved inner walls of cross-sectional shape shown in FIG. 5B.
Figure 8A:
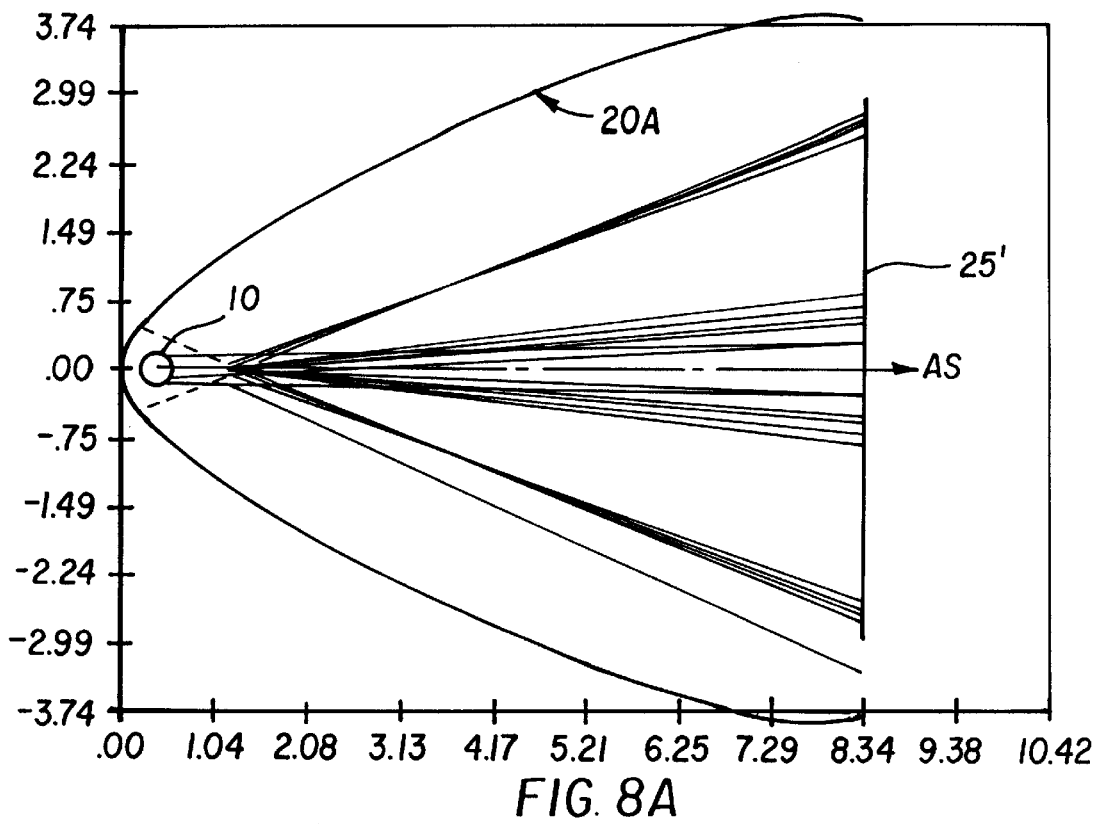
FIGS. 8A–8D depict the light rays reflected of the different segments of the curved inner walls of cross-sectional shape shown in FIG. 6.
Figure 8B:
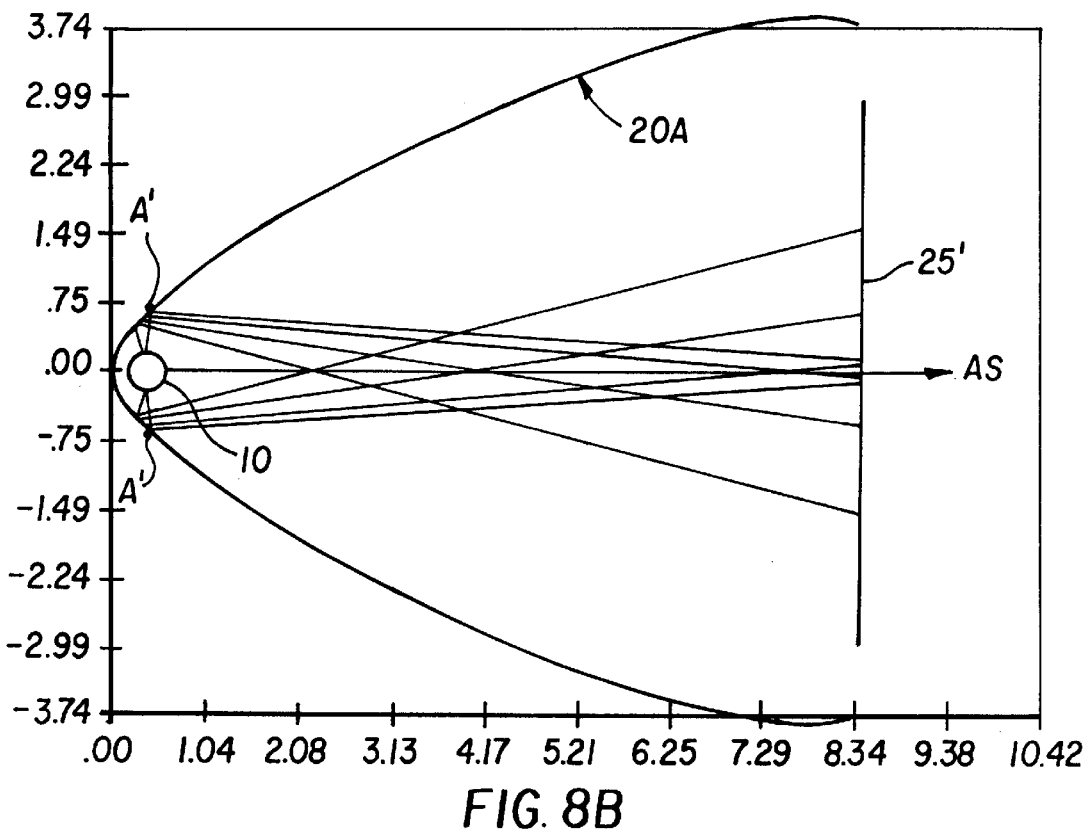
Figure 8C:
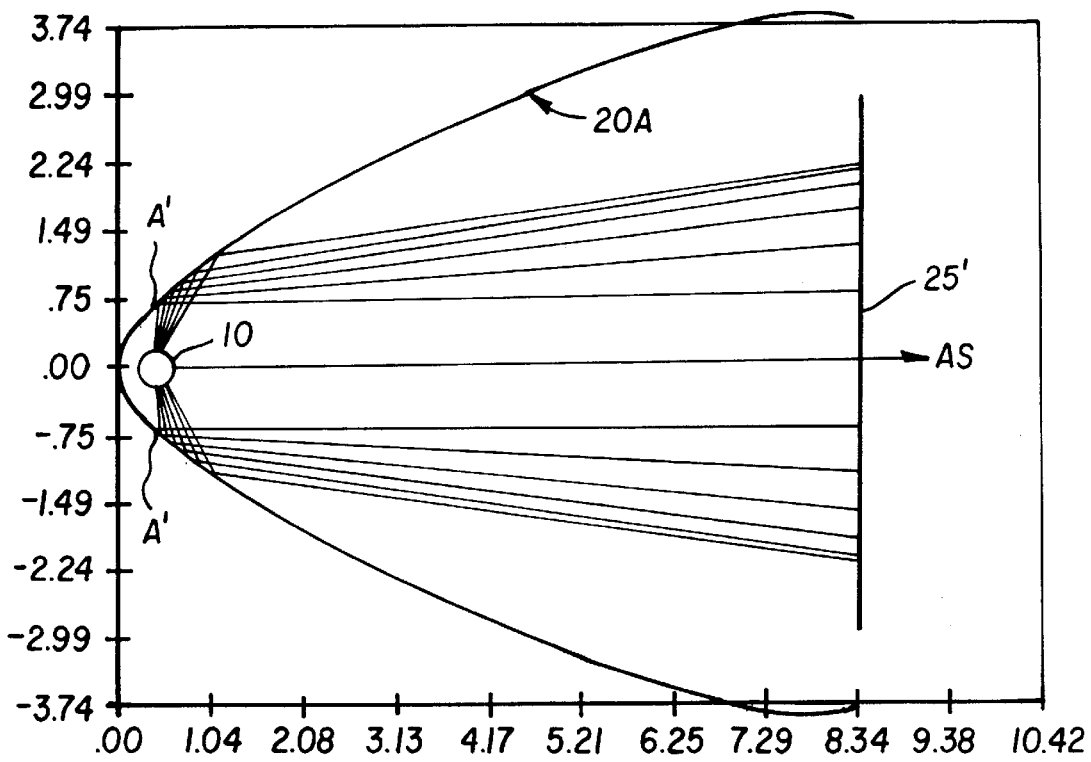
Figure 8D:
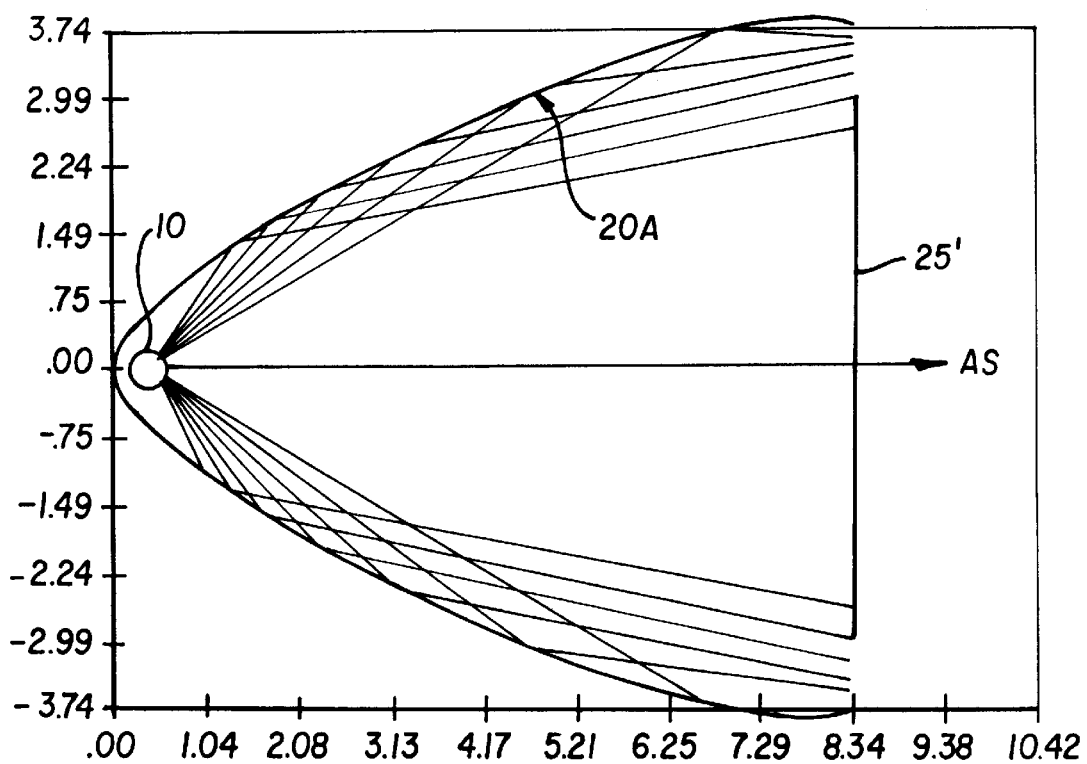

FIG. 7 illustrates the behavior of the light rays striking the reflective surface of cross-section 24. FIGS. 8A–8D illustrate the behavior of the light rays striking different segments of the reflective inner wall surface having the cross-section 24'. The inner walls 20A and thus the cross-section 24, 24' is made of a plurality of reflective segments. Nearly all of the light rays reflected from the first reflective segment (0 to about 90°) are directed to cross the axis of symmetry AS before they reach the transfer plane 25, 25'. The light rays striking closest to the edge of this reflective segment (near point A') tend to strike this axis of symmetry AS closer to the transfer plane 25, 25', while the light rays striking closer to the vertex V of the cross-section tend to cross this axis of symmetry closer to the light source. (See FIG. 7 and FIGS. 8A and 8B). Nearly all of the light rays striking the reflector walls at the angles beyond about 90° strike the transfer plane on the same side of the axis of symmetry AS. (See FIG. 7 and FIGS. 8C and 8D). Thus, most of these light rays do not cross the axis of symmetry AS. Overlapping the light rays from two sides of the reflective inner walls of the first segment while keeping the light rays on the same side of the axis in the second segment allows the light rays to mitigate any shadowing effect caused by the flash lamp 10 and keeps the light rays striking the transfer plane at a relatively shallow angles. These shallow angles are equal to or are smaller than the angles of incidence on the transfer plane of the light rays directly emanating from the flash lamp 10.

Figure 9:
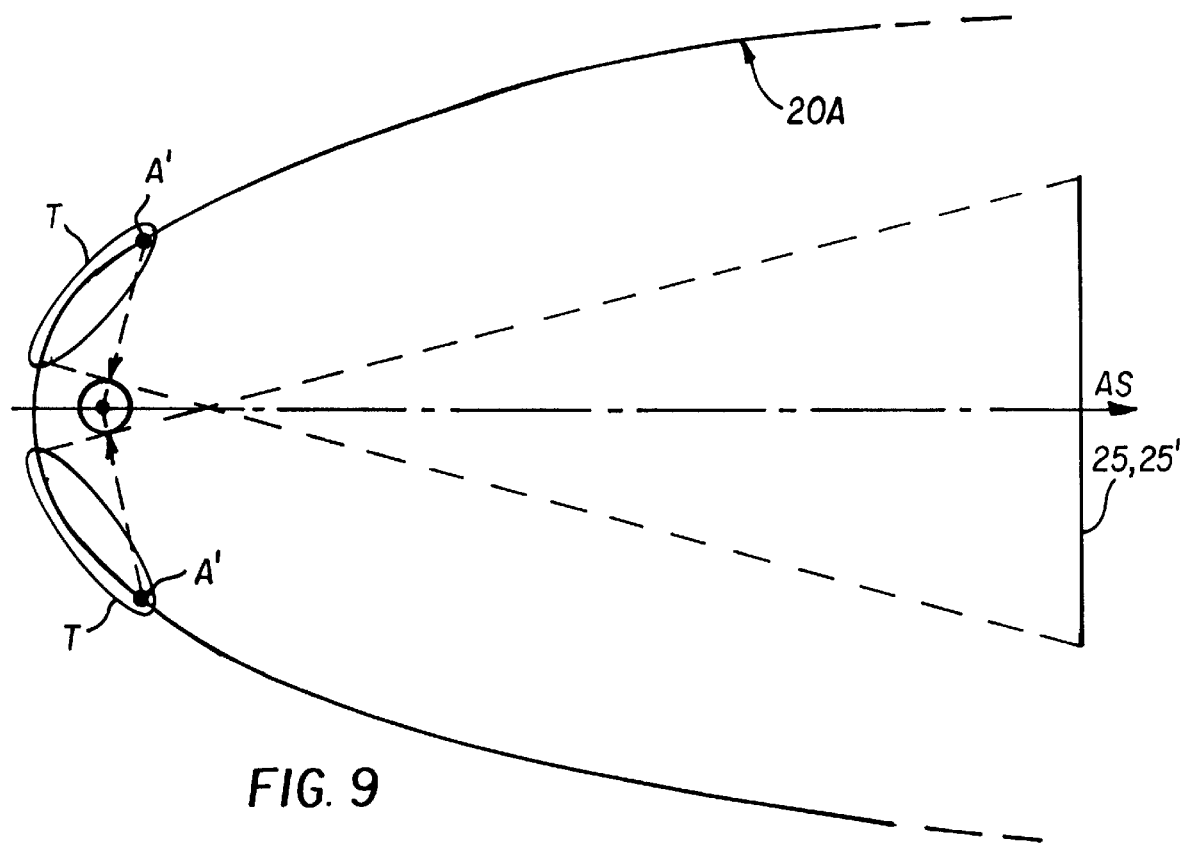
FIG. 9 depicts the location of a transition zone T between two segments of the curved inner walls 20A.

In the two reflector embodiments previously discussed, the transition zone T between the two reflective segments occurs near the point A which is located at about 90° angle to the axis of symmetry. This does not have to be so. The location of the transition zone T may occur in a place on the reflector curve wall surface where when the light rays are reflected of the curved surface walls 20A towards the transfer plane 25, 25', these reflected rays will not intersect the light source. This is illustrated in FIG. 9. It is preferred that these reflected rays intersect the axis of symmetry AS in the space in front of the light source and behind the transfer plane.

TABLE 1

| Point # | X | Y |
|---|---|---|
| 1 | −0.3 | 0 |
| 2 | −0.299974 | 0.005237 |
| 3 | −0.299887 | 0.010472 |
| 4 | −0.29974 | 0.015709 |
| 5 | −0.299532 | 0.020945 |
| 6 | −0.299264 | 0.026182 |
| 7 | −0.298936 | 0.031419 |
| 8 | −0.298547 | 0.036657 |
| 9 | −0.298099 | 0.041895 |
| 10 | −0.297591 | 0.047134 |
| 11 | −0.297023 | 0.052373 |
| 12 | −0.296395 | 0.057613 |
| 13 | −0.295707 | 0.062854 |
| 14 | −0.294959 | 0.068097 |
| 15 | −0.294152 | 0.07334 |
| 16 | −0.293284 | 0.078585 |
| 17 | −0.292356 | 0.083832 |
| 18 | −0.291369 | 0.08908 |
| 19 | −0.290321 | 0.094331 |
| 20 | −0.289212 | 0.099584 |
| 21 | −0.288043 | 0.104839 |
| 22 | −0.286813 | 0.110097 |
| 23 | −0.285522 | 0.115359 |
| 24 | −0.284169 | 0.120623 |
| 25 | −0.282755 | 0.125891 |
| 26 | −0.281279 | 0.131163 |
| 27 | −0.279741 | 0.136439 |
| 28 | −0.27814 | 0.14172 |
| 29 | −0.276477 | 0.147006 |
| 30 | −0.274925 | 0.151767 |
| 31 | −0.273322 | 0.156533 |
| 32 | −0.271667 | 0.161304 |
| 33 | −0.269959 | 0.16608 |
| 34 | −0.268198 | 0.170862 |
| 35 | −0.266384 | 0.175649 |
| 36 | −0.264517 | 0.180442 |
| 37 | −0.262595 | 0.185241 |
| 38 | −0.260619 | 0.190047 |
| 39 | −0.258587 | 0.194859 |
| 40 | −0.2565 | 0.19968 |
| 41 | −0.254356 | 0.204508 |
| 42 | −0.252156 | 0.209343 |
| 43 | −0.249898 | 0.214188 |
| 44 | −0.247581 | 0.219041 |

TABLE 1-continued

| Point # | X | Y |
|---|---|---|
| 45 | −0.245206 | 0.223903 |
| 46 | −0.242771 | 0.228775 |
| 47 | −0.240276 | 0.233657 |
| 48 | −0.23772 | 0.23855 |
| 49 | −0.235101 | 0.243453 |
| 50 | −0.23242 | 0.248368 |
| 51 | −0.229983 | 0.252747 |
| 52 | −0.227495 | 0.257135 |
| 53 | −0.224955 | 0.261533 |
| 54 | −0.222363 | 0.265942 |
| 55 | −0.219718 | 0.270361 |
| 56 | −0.217019 | 0.274792 |
| 57 | −0.214265 | 0.279233 |
| 58 | −0.211456 | 0.283687 |
| 59 | −0.20859 | 0.288153 |
| 60 | −0.205667 | 0.292632 |
| 61 | −0.202686 | 0.297123 |
| 62 | −0.199646 | 0.301628 |
| 63 | −0.196545 | 0.306147 |
| 64 | −0.193384 | 0.310681 |
| 65 | −0.190161 | 0.315229 |
| 66 | −0.186874 | 0.319792 |
| 67 | −0.183523 | 0.324371 |
| 68 | −0.180537 | 0.328391 |
| 69 | −0.1775 | 0.332423 |
| 70 | −0.174412 | 0.336469 |
| 71 | −0.17127 | 0.340527 |
| 72 | −0.168076 | 0.3446 |
| 73 | −0.164826 | 0.348687 |
| 74 | −0.161522 | 0.352788 |
| 75 | −0.158161 | 0.356904 |
| 76 | −0.154743 | 0.361035 |
| 77 | −0.151266 | 0.365181 |
| 78 | −0.14773 | 0.369344 |
| 79 | −0.144134 | 0.373523 |
| 80 | −0.140476 | 0.377718 |
| 81 | −0.136755 | 0.381931 |
| 82 | −0.132977 | 0.386183 |
| 83 | −0.129147 | 0.390492 |
| 84 | −0.125819 | 0.394231 |
| 85 | −0.122449 | 0.398012 |
| 86 | −0.119034 | 0.401837 |
| 87 | −0.115573 | 0.405706 |
| 88 | −0.112064 | 0.409621 |
| 89 | −0.108505 | 0.41358 |
| 90 | −0.104895 | 0.417586 |
| 91 | −0.101231 | 0.421638 |
| 92 | −0.097512 | 0.425737 |
| 93 | −0.093735 | 0.429884 |
| 94 | −0.089898 | 0.434079 |
| 95 | −0.086 | 0.438322 |
| 96 | −0.082039 | 0.442613 |
| 97 | −0.078011 | 0.446954 |
| 98 | −0.073916 | 0.451343 |
| 99 | −0.070449 | 0.455039 |
| 100 | −0.066933 | 0.458769 |
| 101 | −0.063365 | 0.462533 |
| 102 | −0.059744 | 0.466332 |
| 103 | −0.05607 | 0.470166 |
| 104 | −0.05234 | 0.474034 |
| 105 | −0.048553 | 0.477936 |
| 106 | −0.044708 | 0.481873 |
| 107 | −0.040804 | 0.485844 |
| 108 | −0.036838 | 0.489848 |
| 109 | −0.03281 | 0.493887 |
| 110 | −0.028719 | 0.497959 |
| 111 | −0.024562 | 0.502064 |
| 112 | −0.020338 | 0.506203 |
| 113 | −0.016046 | 0.510373 |
| 114 | −0.011684 | 0.514577 |
| 115 | −0.007252 | 0.518811 |
| 116 | −0.002746 | 0.523077 |
| 117 | 0.000912 | 0.526512 |
| 118 | 0.004618 | 0.529969 |
| 119 | 0.008373 | 0.533454 |
| 120 | 0.012178 | 0.536971 |
| 121 | 0.016034 | 0.540518 |

TABLE 1-continued

| Point # | X | Y |
| --- | --- | --- |
| 122 | 0.019943 | 0.544097 |
| 123 | 0.023905 | 0.547708 |
| 124 | 0.027922 | 0.551351 |
| 125 | 0.031994 | 0.555026 |
| 126 | 0.036123 | 0.558734 |
| 127 | 0.04031 | 0.562476 |
| 128 | 0.044556 | 0.566251 |
| 129 | 0.048863 | 0.57006 |
| 130 | 0.053231 | 0.573904 |
| 131 | 0.057661 | 0.577783 |
| 132 | 0.062156 | 0.581697 |
| 133 | 0.066717 | 0.585646 |
| 134 | 0.071344 | 0.589632 |
| 135 | 0.076039 | 0.593654 |
| 136 | 0.080804 | 0.597713 |
| 137 | 0.08564 | 0.601808 |
| 138 | 0.090549 | 0.605942 |
| 139 | 0.095531 | 0.610113 |
| 140 | 0.100589 | 0.614323 |
| 141 | 0.105724 | 0.618571 |
| 142 | 0.109626 | 0.621783 |
| 143 | 0.113574 | 0.625017 |
| 144 | 0.117567 | 0.628273 |
| 145 | 0.121607 | 0.631552 |
| 146 | 0.125693 | 0.634853 |
| 147 | 0.129827 | 0.638177 |
| 148 | 0.13401 | 0.641524 |
| 149 | 0.138242 | 0.644894 |
| 150 | 0.142523 | 0.648288 |
| 151 | 0.146856 | 0.651704 |
| 152 | 0.15124 | 0.655144 |
| 153 | 0.155676 | 0.658608 |
| 154 | 0.160165 | 0.662095 |
| 155 | 0.164708 | 0.665606 |
| 156 | 0.169306 | 0.669142 |
| 157 | 0.173959 | 0.672701 |
| 158 | 0.178669 | 0.676285 |
| 159 | 0.183436 | 0.679893 |
| 160 | 0.188261 | 0.683526 |
| 161 | 0.193145 | 0.687183 |
| 162 | 0.198089 | 0.690865 |
| 163 | 0.203093 | 0.694572 |
| 164 | 0.20816 | 0.698304 |
| 165 | 0.213288 | 0.702061 |
| 166 | 0.218481 | 0.705844 |
| 167 | 0.223738 | 0.709651 |
| 168 | 0.22906 | 0.713484 |
| 169 | 0.234449 | 0.717343 |
| 170 | 0.239905 | 0.721227 |
| 171 | 0.24543 | 0.725137 |
| 172 | 0.251024 | 0.729072 |
| 173 | 0.256689 | 0.733034 |
| 174 | 0.262425 | 0.737021 |
| 175 | 0.268234 | 0.741034 |
| 176 | 0.274117 | 0.745073 |
| 177 | 0.280076 | 0.749141 |
| 178 | 0.286115 | 0.753248 |
| 179 | 0.292236 | 0.757392 |
| 180 | 0.298441 | 0.761575 |
| 181 | 0.302624 | 0.764385 |
| 182 | 0.306846 | 0.767213 |
| 183 | 0.311106 | 0.770059 |
| 184 | 0.315406 | 0.772924 |
| 185 | 0.319746 | 0.775806 |
| 186 | 0.324126 | 0.778707 |
| 187 | 0.328547 | 0.781627 |
| 188 | 0.33301 | 0.784565 |
| 189 | 0.337514 | 0.787523 |
| 190 | 0.342061 | 0.7905 |
| 191 | 0.346651 | 0.793497 |
| 192 | 0.351285 | 0.796513 |
| 193 | 0.355963 | 0.79955 |
| 194 | 0.360686 | 0.802607 |
| 195 | 0.365455 | 0.805684 |
| 196 | 0.370269 | 0.808782 |
| 197 | 0.375131 | 0.811901 |
| 198 | 0.38004 | 0.815042 |
| 199 | 0.384997 | 0.818204 |
| 200 | 0.390002 | 0.821387 |
| 201 | 0.395058 | 0.824593 |
| 202 | 0.400163 | 0.827821 |
| 203 | 0.405319 | 0.831071 |
| 204 | 0.410527 | 0.834345 |
| 205 | 0.415787 | 0.837641 |
| 206 | 0.4211 | 0.840961 |
| 207 | 0.426466 | 0.844304 |
| 208 | 0.431888 | 0.847672 |
| 209 | 0.437364 | 0.851063 |
| 210 | 0.442897 | 0.854479 |
| 211 | 0.448487 | 0.857921 |
| 212 | 0.454134 | 0.861386 |
| 213 | 0.45984 | 0.864878 |
| 214 | 0.465606 | 0.868396 |
| 215 | 0.471431 | 0.871939 |
| 216 | 0.477318 | 0.875509 |
| 217 | 0.483268 | 0.879105 |
| 218 | 0.489279 | 0.882729 |
| 219 | 0.495356 | 0.88638 |
| 220 | 0.501497 | 0.890059 |
| 221 | 0.507704 | 0.893766 |
| 222 | 0.513978 | 0.897501 |
| 223 | 0.52032 | 0.901266 |
| 224 | 0.52673 | 0.905059 |
| 225 | 0.533211 | 0.908882 |
| 226 | 0.539763 | 0.912735 |
| 227 | 0.546387 | 0.916619 |
| 228 | 0.553084 | 0.920533 |
| 229 | 0.559856 | 9.924478 |
| 230 | 0.566703 | 0.928455 |
| 231 | 0.573627 | 0.932464 |
| 232 | 0.580629 | 0.936505 |
| 233 | 0.58771 | 0.94058 |
| 234 | 0.594871 | 0.944687 |
| 235 | 0.602114 | 0.948828 |
| 236 | 0.609441 | 0.953003 |
| 237 | 0.616851 | 0.957213 |
| 238 | 0.624347 | 0.961458 |
| 239 | 0.63193 | 0.965739 |
| 240 | 0.639602 | 0.970056 |
| 241 | 0.647363 | 0.974409 |
| 242 | 0.655216 | 0.978799 |
| 243 | 0.663162 | 0.983227 |
| 244 | 0.671201 | 0.987692 |
| 245 | 0.679337 | 0.992197 |
| 246 | 0.687571 | 0.99674 |
| 247 | 0.695903 | 1.001323 |
| 248 | 0.704336 | 1.005947 |
| 249 | 0.712872 | 1.010611 |
| 250 | 0.721511 | 1.015316 |
| 251 | 0.730257 | 1.020063 |
| 252 | 0.73467 | 1.022453 |
| 253 | 0.739111 | 1.024853 |
| 254 | 0.743579 | 1.027264 |
| 255 | 0.748074 | 1.029686 |
| 256 | 0.752597 | 1.032119 |
| 257 | 0.757148 | 1.034563 |
| 258 | 0.761728 | 1.037018 |
| 259 | 0.766336 | 1.039484 |
| 260 | 0.770973 | 1.041962 |
| 261 | 0.775639 | 1.04445 |
| 262 | 0.780334 | 1.046951 |
| 263 | 0.785059 | 1.049462 |
| 264 | 0.789813 | 1.051985 |
| 265 | 0.794599 | 1.05452 |
| 266 | 0.799414 | 1.057067 |
| 267 | 0.804259 | 1.059625 |
| 268 | 0.809136 | 1.062196 |
| 269 | 0.814044 | 1.064778 |
| 270 | 0.818983 | 1.067372 |
| 271 | 0.823954 | 1.069979 |
| 272 | 0.828957 | 1.072598 |
| 273 | 0.833991 | 1.075229 |
| 274 | 0.839059 | 1.077873 |
| 275 | 0.84416 | 1.080529 |

TABLE 1-continued

| Point # | X | Y |
| --- | --- | --- |
| 276 | 0.849293 | 1.083198 |
| 277 | 0.854461 | 1.085879 |
| 278 | 0.859662 | 1.088574 |
| 279 | 0.864897 | 1.091282 |
| 280 | 0.870166 | 1.094002 |
| 281 | 0.87547 | 1.096736 |
| 282 | 0.880809 | 1.099482 |
| 283 | 0.886183 | 1.102242 |
| 284 | 0.891593 | 1.105016 |
| 285 | 0.897038 | 1.107803 |
| 286 | 0.90252 | 1.110603 |
| 287 | 0.908039 | 1.113418 |
| 288 | 0.913594 | 1.116246 |
| 289 | 0.919187 | 1.119088 |
| 290 | 0.924817 | 1.121944 |
| 291 | 0.930485 | 1.124814 |
| 292 | 0.93619 | 1.127698 |
| 293 | 0.941935 | 1.130597 |
| 294 | 0.947718 | 1.13351 |
| 295 | 0.953541 | 1.136437 |
| 296 | 0.959404 | 1.13938 |
| 297 | 0.965307 | 1.142337 |
| 298 | 0.97125 | 1.145309 |
| 299 | 0.977233 | 1.148296 |
| 300 | 0.983258 | 1.151298 |
| 301 | 0.989324 | 1.154315 |
| 302 | 0.995433 | 1.157348 |
| 303 | 1.001584 | 1.160396 |
| 304 | 1.007777 | 1.163459 |
| 305 | 1.014014 | 1.166539 |
| 306 | 1.020294 | 1.169634 |
| 307 | 1.026618 | 1.172745 |
| 308 | 1.032986 | 1.175872 |
| 309 | 1.039399 | 1.179016 |
| 310 | 1.045857 | 1.182175 |
| 311 | 1.052361 | 1.185351 |
| 312 | 1.058911 | 1.188544 |
| 313 | 1.065507 | 1.191754 |
| 314 | 1.072151 | 1.19498 |
| 315 | 1.078842 | 1.198223 |
| 316 | 1.08558 | 1.201483 |
| 317 | 1.092367 | 1.204761 |
| 318 | 1.099203 | 1.208056 |
| 319 | 1.106087 | 1.211368 |
| 320 | 1.113022 | 1.214698 |
| 321 | 1.120007 | 1.218046 |
| 322 | 1.127043 | 1.221412 |
| 323 | 1.13413 | 1.224796 |
| 324 | 1.141268 | 1.228198 |
| 325 | 1.148459 | 1.231618 |
| 326 | 1.155703 | 1.235057 |
| 327 | 1.163 | 1.238515 |
| 328 | 1.170349 | 1.241991 |
| 329 | 1.177754 | 1.245486 |
| 330 | 1.185213 | 1.249 |
| 331 | 1.192728 | 1.252534 |
| 332 | 1.200299 | 1.256087 |
| 333 | 1.207926 | 1.25966 |
| 334 | 1.215611 | 1.263252 |
| 335 | 1.223353 | 1.266864 |
| 336 | 1.231153 | 1.270496 |
| 337 | 1.239011 | 1.274148 |
| 338 | 1.246929 | 1.277821 |
| 339 | 1.254908 | 1.281514 |
| 340 | 1.262947 | 1.285228 |
| 341 | 1.271047 | 1.288963 |
| 342 | 1.279208 | 1.292719 |
| 343 | 1.287433 | 1.296496 |
| 344 | 1.29572 | 1.300295 |
| 345 | 1.304071 | 1.304114 |
| 346 | 1.312485 | 1.307956 |
| 347 | 1.320966 | 1.311819 |
| 348 | 1.329512 | 1.315705 |
| 349 | 1.338124 | 1.319613 |
| 350 | 1.346804 | 1.323543 |
| 351 | 1.355551 | 1.327496 |
| 352 | 1.364366 | 1.331472 |

TABLE 1-continued

| Point # | X | Y |
| --- | --- | --- |
| 353 | 1.373251 | 1.335471 |
| 354 | 1.382206 | 1.339493 |
| 355 | 1.39123 | 1.343538 |
| 356 | 1.400327 | 1.347607 |
| 357 | 1.409495 | 1.351699 |
| 358 | 1.418737 | 1.355816 |
| 359 | 1.428052 | 1.359957 |
| 360 | 1.437441 | 1.364122 |
| 361 | 1.446906 | 1.368312 |
| 362 | 1.456446 | 1.372527 |
| 363 | 1.466063 | 1.376766 |
| 364 | 1.475757 | 1.38103 |
| 365 | 1.48553 | 1.38532 |
| 366 | 1.495382 | 1.389636 |
| 367 | 1.505315 | 1.393977 |
| 368 | 1.515328 | 1.398345 |
| 369 | 1.525423 | 1.402738 |
| 370 | 1.535601 | 1.407159 |
| 371 | 1.545862 | 1.411606 |
| 372 | 1.556208 | 1.416079 |
| 373 | 1.566637 | 1.42058 |
| 374 | 1.577155 | 1.425108 |
| 375 | 1.587759 | 1.429664 |
| 376 | 1.598452 | 1.434248 |
| 377 | 1.609233 | 1.438859 |
| 378 | 1.620105 | 1.443499 |
| 379 | 1.631068 | 1.448168 |
| 380 | 1.642122 | 1.452865 |
| 381 | 1.65327 | 1.457591 |
| 382 | 1.66451 | 1.462346 |
| 383 | 1.675847 | 1.467131 |
| 384 | 1.68728 | 1.471946 |
| 385 | 1.69881 | 1.47679 |
| 386 | 1.710438 | 1.481665 |
| 387 | 1.722165 | 1.48657 |
| 388 | 1.733993 | 1.491506 |
| 389 | 1.745923 | 1.496473 |
| 390 | 1.757953 | 1.501471 |
| 391 | 1.770089 | 1.506501 |
| 392 | 1.78233 | 1.511562 |
| 393 | 1.794677 | 1.516656 |
| 394 | 1.807132 | 1.521782 |
| 395 | 1.819694 | 1.52694 |
| 396 | 1.832367 | 1.532132 |
| 397 | 1.84515 | 1.537356 |
| 398 | 1.858045 | 1.542614 |
| 399 | 1.871053 | 1.547904 |
| 400 | 1.884176 | 1.55323 |
| 401 | 1.897416 | 1.558589 |
| 402 | 1.910773 | 1.563984 |
| 403 | 1.924248 | 1.569413 |
| 404 | 1.937844 | 1.574877 |
| 405 | 1.95156 | 1.580376 |
| 406 | 1.9654 | 1.585911 |
| 407 | 1.979363 | 1.591482 |
| 408 | 1.993451 | 1.597088 |
| 409 | 2.007667 | 1.602732 |
| 410 | 2.022011 | 1.608413 |
| 411 | 2.036485 | 1.614131 |
| 412 | 2.05109 | 1.619886 |
| 413 | 2.065828 | 1.625679 |
| 414 | 2.080701 | 1.631509 |
| 415 | 2.095709 | 1.637379 |
| 416 | 2.110855 | 1.643286 |
| 417 | 2.126137 | 1.649232 |
| 418 | 2.141562 | 1.655218 |
| 419 | 2.157129 | 1.661244 |
| 420 | 2.17284 | 1.66731 |
| 421 | 2.188697 | 1.673415 |
| 422 | 2.2047 | 1.679561 |
| 423 | 2.220853 | 1.685748 |
| 424 | 2.237156 | 1.691977 |
| 425 | 2.253611 | 1.698246 |
| 426 | 2.270218 | 1.704557 |
| 427 | 2.286983 | 1.710911 |
| 428 | 2.303905 | 1.717307 |
| 429 | 2.320987 | 1.723745 |

TABLE 1-continued

| Point # | X | Y |
|---|---|---|
| 430 | 2.33823 | 1.730227 |
| 431 | 2.355636 | 1.736753 |
| 432 | 2.373208 | 1.743322 |
| 433 | 2.390946 | 1.749935 |
| 434 | 2.408852 | 1.756592 |
| 435 | 2.426928 | 1.763293 |
| 436 | 2.445178 | 1.77004 |
| 437 | 2.463603 | 1.776833 |
| 438 | 2.482204 | 1.783671 |
| 439 | 2.500984 | 1.790555 |
| 440 | 2.519945 | 1.797485 |
| 441 | 2.539089 | 1.804462 |
| 442 | 2.558418 | 1.811486 |
| 443 | 2.577934 | 1.818557 |
| 444 | 2.597636 | 1.825674 |
| 445 | 2.617533 | 1.832841 |
| 446 | 2.637623 | 1.840055 |
| 447 | 2.657909 | 1.847318 |
| 448 | 2.678393 | 1.85463 |
| 449 | 2.699077 | 1.861991 |
| 450 | 2.719964 | 1.869402 |
| 451 | 2.741055 | 1.876862 |
| 452 | 2.762354 | 1.884372 |
| 453 | 2.78386 | 1.891931 |
| 454 | 2.80558 | 1.899542 |
| 455 | 2.827515 | 1.907204 |
| 456 | 2.849666 | 1.914917 |
| 457 | 2.872037 | 1.922681 |
| 458 | 2.894629 | 1.930497 |
| 459 | 2.917445 | 1.938365 |
| 460 | 2.940488 | 1.946285 |
| 461 | 2.96376 | 1.954258 |
| 462 | 2.98726 | 1.962282 |
| 463 | 3.010998 | 1.97036 |
| 464 | 3.034972 | 1.978492 |
| 465 | 3.059186 | 1.986676 |
| 466 | 3.083642 | 1.994915 |
| 467 | 3.108342 | 2.003206 |
| 468 | 3.13329 | 2.011553 |
| 469 | 3.158488 | 2.019953 |
| 470 | 3.183938 | 2.028407 |
| 471 | 3.20964 | 2.036915 |
| 472 | 3.235603 | 2.045478 |
| 473 | 3.261827 | 2.054096 |
| 474 | 3.288314 | 2.062769 |
| 475 | 3.315067 | 2.071497 |
| 476 | 3.342089 | 2.08028 |
| 477 | 3.369382 | 2.089118 |
| 478 | 3.39695 | 2.098011 |
| 479 | 3.424795 | 2.106959 |
| 480 | 3.452916 | 2.115962 |
| 481 | 3.481324 | 2.125021 |
| 482 | 3.510016 | 2.134134 |
| 483 | 3.538997 | 2.143303 |
| 484 | 3.56827 | 2.152528 |
| 485 | 3.597835 | 2.161807 |
| 486 | 3.627697 | 2.17114 |
| 487 | 3.657858 | 2.180529 |
| 488 | 3.688321 | 2.189972 |
| 489 | 3.719084 | 2.199468 |
| 490 | 3.750158 | 2.209019 |
| 491 | 3.781542 | 2.218624 |
| 492 | 3.813239 | 2.228283 |
| 493 | 3.845252 | 2.237995 |
| 494 | 3.877581 | 2.24776 |
| 495 | 3.910231 | 2.257577 |
| 496 | 3.943204 | 2.267446 |
| 497 | 3.976502 | 2.277367 |
| 498 | 4.010044 | 2.287292 |
| 499 | 4.043145 | 2.296829 |
| 500 | 4.07581 | 2.305984 |
| 501 | 4.108044 | 2.314765 |
| 502 | 4.139857 | 2.32318 |
| 503 | 4.171256 | 2.331236 |
| 504 | 4.202249 | 2.338941 |
| 505 | 4.232843 | 2.346302 |
| 506 | 4.263047 | 2.353326 |

TABLE 1-continued

| Point # | X | Y |
|---|---|---|
| 507 | 4.292863 | 2.360019 |
| 508 | 4.322309 | 2.366392 |
| 509 | 4.351386 | 2.372449 |
| 510 | 4.380103 | 2.378198 |
| 511 | 4.408468 | 2.383645 |
| 512 | 4.436487 | 2.388796 |
| 513 | 4.464169 | 2.39366 |
| 514 | 4.491519 | 2.398241 |
| 515 | 4.518547 | 2.402546 |
| 516 | 4.545254 | 2.40658 |
| 517 | 4.571655 | 2.410352 |
| 518 | 4.597754 | 2.413866 |
| 519 | 4.623558 | 2.417128 |
| 520 | 4.649073 | 2.420143 |
| 521 | 4.674305 | 2.422918 |
| 522 | 4.699261 | 2.425457 |
| 523 | 4.723948 | 2.427766 |
| 524 | 4.748371 | 2.42985 |
| 525 | 4.772535 | 2.431714 |
| 526 | 4.796451 | 2.433364 |
| 527 | 4.820122 | 2.434803 |
| 528 | 4.843554 | 2.436038 |
| 529 | 4.866753 | 2.437071 |
| 530 | 4.889724 | 2.437909 |
| 531 | 4.912474 | 2.438554 |
| 532 | 4.935006 | 2.439012 |
| 533 | 4.957327 | 2.439287 |
| 534 | 4.97944 | 2.439382 |
| 535 | 5.001354 | 2.439302 |
| 536 | 5.023072 | 2.439051 |
| 537 | 5.044599 | 2.438632 |
| 538 | 5.065939 | 2.438049 |
| 539 | 5.087099 | 2.437305 |
| 540 | 5.10808 | 2.436404 |
| 541 | 5.128889 | 2.435349 |
| 542 | 5.14953 | 2.434144 |
| 543 | 5.170004 | 2.432792 |
| 544 | 5.19032 | 2.431296 |
| 545 | 5.210481 | 2.429659 |
| 546 | 5.230489 | 2.427883 |
| 547 | 5.25035 | 2.425972 |
| 548 | 5.270067 | 2.423929 |
| 549 | 5.289642 | 2.421755 |
| 550 | 5.309083 | 2.419455 |
| 551 | 5.328383 | 2.41703 |
| 552 | 5.347558 | 2.414482 |
| 553 | 5.366606 | 2.411814 |
| 554 | 5.38553 | 2.409029 |
| 555 | 5.404334 | 2.406129 |
| 556 | 5.42302 | 2.403115 |
| 557 | 5.441592 | 2.39999 |
| 558 | 5.460052 | 2.396757 |
| 559 | 5.478404 | 2.393416 |
| 560 | 5.496647 | 2.389971 |
| 561 | 5.514789 | 2.386422 |
| 562 | 5.532831 | 2.382772 |
| 563 | 5.550774 | 2.379023 |
| 564 | 5.568622 | 2.375175 |
| 565 | 5.586376 | 2.371232 |
| 566 | 5.604039 | 2.367194 |
| 567 | 5.621614 | 2.363063 |
| 568 | 5.639102 | 2.358841 |
| 569 | 5.656503 | 2.354529 |
| 570 | 5.673825 | 2.350128 |
| 571 | 5.691066 | 2.34564 |
| 572 | 5.70823 | 2.341067 |
| 573 | 5.725317 | 2.336409 |
| 574 | 5.74233 | 2.331667 |
| 575 | 5.759269 | 2.326844 |
| 576 | 5.776139 | 2.32194 |
| 577 | 5.792939 | 2.316957 |
| 578 | 5.809669 | 2.311895 |
| 579 | 5.826337 | 2.306756 |
| 580 | 5.84294 | 2.30154 |
| 581 | 5.859481 | 2.296249 |
| 582 | 5.87596 | 2.290884 |
| 583 | 5.89238 | 2.285446 |

TABLE 1-continued

| Point # | X | Y |
|---|---|---|
| 584 | 5.908742 | 2.279935 |
| 585 | 5.925048 | 2.274353 |
| 586 | 5.941298 | 2.2687 |
| 587 | 5.957491 | 2.262978 |
| 588 | 5.973634 | 2.257187 |
| 589 | 5.989726 | 2.251328 |
| 590 | 6.005767 | 2.245401 |
| 591 | 6.02176 | 2.239408 |
| 592 | 6.037704 | 2.233349 |
| 593 | 6.053602 | 2.227226 |
| 594 | 6.069454 | 2.221037 |
| 595 | 6.085261 | 2.214786 |
| 596 | 6.101023 | 2.208472 |
| 597 | 6.116745 | 2.202095 |
| 598 | 6.132424 | 2.195656 |
| 599 | 6.148064 | 2.389156 |
| 600 | 6.163663 | 2.182596 |
| 601 | 6.179224 | 2.175975 |
| 602 | 6.194747 | 2.169296 |
| 603 | 6.210233 | 2.162557 |
| 604 | 6.225683 | 2.15576 |
| 605 | 6.241096 | 2.148906 |
| 606 | 6.256476 | 2.141994 |
| 607 | 6.271823 | 2.135026 |
| 608 | 6.287137 | 2.128 |
| 609 | 6.302419 | 2.120919 |
| 610 | 6.317669 | 2.113782 |
| 611 | 6.332889 | 2.10659 |
| 612 | 6.348078 | 2.099344 |
| 613 | 6.363239 | 2.092043 |
| 614 | 6.378368 | 2.084689 |
| 615 | 6.393473 | 2.077281 |

TABLE 2

Intensity Distribution

| | | | | |
|---|---|---|---|---|
| 106.373 | 106.683 | 106.062 | 106.683 | 106.3730 |
| 102.746 | 103.212 | 102.746 | 103.212 | 102.746 |
| 99.6373 | 100.155 | 99.6373 | 100.155 | 99.6373 |
| 100.414 | 100.829 | 100.518 | 100.829 | 100.414 |
| 99.8445 | 100.414 | 99.8963 | 100.414 | 99.84455 |
| 100.310 | 100.621 | 100.103 | 100.621 | 100.3108 |
| 100.310 | 100.621 | 100.518 | 100.621 | 100.311 |
| 99.4818 | 100 | 99.4818 | 100 | 99.4819 |
| 102.435 | 102.901 | 102.435 | 102.901 | 102.435 |
| 105.699 | 106.062 | 105.544 | 106.062 | 105.6994 |

TABLE 3

| Point # | X | Y |
|---|---|---|
| 1 | −0.3940 | 0.0000 |
| 2 | −0.3935 | 0.0055 |
| 3 | −0.3934 | 0.0110 |
| 4 | −0.3933 | 0.0165 |
| 5 | −0.3931 | 0.0220 |
| 6 | −0.3928 | 0.0275 |
| 7 | −0.3925 | 0.0330 |
| 8 | −0.3921 | 0.0384 |
| 9 | −0.3916 | 0.0439 |
| 10 | −0.3911 | 0.0494 |
| 11 | −0.3906 | 0.0549 |
| 12 | −0.3899 | 0.0604 |
| 13 | −0.3892 | 0.0658 |
| 14 | −0.3885 | 0.0713 |
| 15 | −0.3877 | 0.0768 |
| 16 | −0.3869 | 0.0822 |
| 17 | −0.3859 | 0.0877 |
| 18 | −0.3850 | 0.0931 |
| 19 | −0.3839 | 0.0986 |
| 20 | −0.3828 | 0.1040 |
| 21 | −0.3817 | 0.1095 |
| 22 | −0.3805 | 0.1149 |
| 23 | −0.3792 | 0.1203 |
| 24 | −0.3779 | 0.1257 |
| 25 | −0.3766 | 0.1311 |
| 26 | −0.3751 | 0.1365 |
| 27 | −0.3736 | 0.1419 |
| 28 | −0.3721 | 0.1473 |
| 29 | −0.3705 | 0.1527 |
| 30 | −0.3689 | 0.1581 |
| 31 | −0.3672 | 0.1635 |
| 32 | −0.3654 | 0.1688 |
| 33 | −0.3636 | 0.1742 |
| 34 | −0.3617 | 0.1796 |
| 35 | −0.3598 | 0.1849 |
| 36 | −0.3578 | 0.1902 |
| 37 | −0.3558 | 0.1956 |
| 38 | −0.3539 | 0.2002 |
| 39 | −0.3521 | 0.2049 |
| 40 | −0.3501 | 0.2096 |
| 41 | −0.3482 | 0.2142 |
| 42 | −0.3462 | 0.2189 |
| 43 | −0.3441 | 0.2235 |
| 44 | −0.3421 | 0.2281 |
| 45 | −0.3399 | 0.2328 |
| 46 | −0.3378 | 0.2374 |
| 47 | −0.3356 | 0.2420 |
| 48 | −0.3333 | 0.2466 |
| 49 | −0.3310 | 0.2512 |
| 50 | −0.3287 | 0.2558 |
| 51 | −0.3263 | 0.2605 |
| 52 | 0.3238 | 0.2651 |
| 53 | −0.3214 | 0.2697 |
| 54 | −0.3188 | 0.2742 |
| 55 | −0.3163 | 0.2788 |
| 56 | −0.3137 | 0.2834 |
| 57 | −0.3110 | 0.2880 |
| 58 | −0.3083 | 0.2926 |
| 59 | −0.3056 | 0.2972 |
| 60 | −0.3028 | 0.3017 |
| 61 | −0.3000 | 0.3063 |
| 62 | −0.2971 | 0.3109 |
| 63 | −0.2942 | 0.3155 |
| 64 | −0.2912 | 0.3200 |
| 65 | −0.2882 | 0.3246 |
| 66 | −0.2851 | 0.3291 |
| 67 | −0.2820 | 0.3337 |
| 68 | −0.2788 | 0.3383 |
| 69 | −0.2756 | 0.3428 |
| 70 | −0.2724 | 0.3474 |
| 71 | −0.2691 | 0.3519 |
| 72 | −0.2657 | 0.3565 |
| 73 | −0.2623 | 0.3610 |
| 74 | −0.2589 | 0.3656 |
| 75 | −0.2553 | 0.3701 |
| 76 | −0.2518 | 0.3747 |
| 77 | −0.2482 | 0.3792 |
| 78 | −0.2450 | 0.3831 |
| 79 | −0.2419 | 0.3871 |
| 80 | −0.2386 | 0.3910 |
| 81 | −0.2354 | 0.3949 |
| 82 | −0.2321 | 0.3988 |
| 83 | −0.2288 | 0.4027 |
| 84 | −0.2254 | 0.4066 |
| 85 | −0.2220 | 0.4105 |
| 86 | −0.2185 | 0.4144 |
| 87 | −0.2150 | 0.4183 |
| 88 | −0.2115 | 0.4223 |
| 89 | −0.2079 | 0.4262 |
| 90 | −0.2042 | 0.4301 |
| 91 | −0.2006 | 0.4340 |
| 92 | −0.1968 | 0.4380 |
| 93 | −0.1931 | 0.4419 |
| 94 | −0.1892 | 0.4458 |
| 95 | −0.1854 | 0.4498 |
| 96 | −0.1815 | 0.4537 |
| 97 | −0.1775 | 0.4576 |

TABLE 3-continued

| Point # | X | Y |
| --- | --- | --- |
| 98 | −0.1735 | 0.4616 |
| 99 | −0.1695 | 0.4656 |
| 100 | −0.1654 | 0.4695 |
| 101 | −0.1612 | 0.4736 |
| 102 | −0.1570 | 0.4776 |
| 103 | −0.1528 | 0.4818 |
| 104 | −0.1486 | 0.4860 |
| 105 | −0.1450 | 0.4896 |
| 106 | −0.1414 | 0.4932 |
| 107 | −0.1378 | 0.4968 |
| 108 | −0.1341 | 0.5005 |
| 109 | −0.1304 | 0.5043 |
| 110 | −0.1267 | 0.5081 |
| 111 | −0.1229 | 0.5120 |
| 112 | −0.1191 | 0.5159 |
| 113 | −0.1152 | 0.5198 |
| 114 | −0.1113 | 0.5238 |
| 115 | −0.1074 | 0.5279 |
| 116 | −0.1034 | 0.5320 |
| 117 | −0.0994 | 0.5362 |
| 118 | −0.0953 | 0.5404 |
| 119 | −0.0911 | 0.5446 |
| 120 | −0.0870 | 0.5490 |
| 121 | −0.0827 | 0.5533 |
| 122 | −0.0784 | 0.5578 |
| 123 | −0.0740 | 0.5622 |
| 124 | −0.0705 | 0.5659 |
| 125 | −0.0669 | 0.5695 |
| 126 | −0.0633 | 0.5732 |
| 127 | −0.0596 | 0.5769 |
| 128 | −0.0559 | 0.5807 |
| 129 | −0.0522 | 0.5844 |
| 130 | −0.0484 | 0.5882 |
| 131 | −0.0445 | 0.5921 |
| 132 | −0.0406 | 0.5960 |
| 133 | −0.0367 | 0.5999 |
| 134 | −0.0327 | 0.6038 |
| 135 | −0.0287 | 0.6078 |
| 136 | −0.0246 | 0.6318 |
| 137 | −0.0204 | 0.6158 |
| 138 | −0.0162 | 0.6198 |
| 139 | −0.0120 | 0.6239 |
| 140 | −0.0077 | 0.6280 |
| 141 | −0.0033 | 0.6321 |
| 142 | 0.0011 | 0.6363 |
| 143 | 0.0056 | 0.6404 |
| 144 | 0.0101 | 0.6447 |
| 145 | 0.0147 | 0.6489 |
| 146 | 0.0194 | 0.6533 |
| 147 | 0.0241 | 0.6577 |
| 148 | 0.0289 | 0.6621 |
| 149 | 0.0338 | 0.6666 |
| 150 | 0.0375 | 0.6700 |
| 151 | 0.0412 | 0.6735 |
| 152 | 0.0450 | 0.6770 |
| 153 | 0.0488 | 0.6805 |
| 154 | 0.0526 | 0.6841 |
| 155 | 0.0565 | 0.6877 |
| 156 | 0.0605 | 0.6913 |
| 157 | 0.0645 | 0.6950 |
| 158 | 0.0685 | 0.6987 |
| 159 | 0.0726 | 0.7024 |
| 160 | 0.0767 | 0.7062 |
| 161 | 0.0809 | 0.7100 |
| 162 | 0.0851 | 0.7139 |
| 163 | 0.0894 | 0.7178 |
| 164 | 0.0937 | 0.7217 |
| 165 | 0.0981 | 0.7257 |
| 166 | 0.1025 | 0.7297 |
| 167 | 0.1070 | 0.7338 |
| 168 | 0.1116 | 0.7379 |
| 169 | 0.1162 | 0.7421 |
| 170 | 0.1209 | 0.7463 |
| 171 | 0.3256 | 0.7505 |
| 172 | 0.3304 | 0.7548 |
| 173 | 0.3352 | 0.7592 |
| 174 | 0.3403 | 0.7635 |
| 175 | 0.1451 | 0.7680 |
| 176 | 0.1501 | 0.7725 |
| 177 | 0.1552 | 0.7770 |
| 178 | 0.1604 | 0.7816 |
| 179 | 0.1657 | 0.7862 |
| 180 | 0.3710 | 0.7909 |
| 181 | 0.3764 | 0.7956 |
| 182 | 0.3818 | 0.8004 |
| 183 | 0.1874 | 0.8052 |
| 184 | 0.1930 | 0.8301 |
| 185 | 0.1968 | 0.8134 |
| 186 | 0.2006 | 0.8167 |
| 187 | 0.2045 | 0.8201 |
| 188 | 0.2083 | 0.8234 |
| 189 | 0.2123 | 0.8268 |
| 190 | 0.2162 | 0.8302 |
| 191 | 0.2203 | 0.8337 |
| 192 | 0.2243 | 0.8371 |
| 193 | 0.2284 | 0.8406 |
| 194 | 0.2325 | 0.8442 |
| 195 | 0.2367 | 0.8477 |
| 196 | 0.2409 | 0.8513 |
| 197 | 0.2451 | 0.8549 |
| 198 | 0.2494 | 0.8585 |
| 199 | 0.2537 | 0.8622 |
| 200 | 0.2581 | 0.8658 |
| 201 | 0.2625 | 0.8695 |
| 202 | 0.2670 | 0.8733 |
| 203 | 0.2715 | 0.8771 |
| 204 | 0.2760 | 0.8808 |
| 205 | 0.2806 | 0.8847 |
| 206 | 0.2853 | 0.8885 |
| 207 | 0.2899 | 0.8924 |
| 208 | 0.2947 | 0.8963 |
| 209 | 0.2995 | 0.9003 |
| 210 | 0.3043 | 0.9042 |
| 211 | 0.3092 | 0.9082 |
| 212 | 0.3141 | 0.9123 |
| 213 | 0.3191 | 0.9163 |
| 214 | 0.3241 | 0.9204 |
| 215 | 0.3292 | 0.9245 |
| 216 | 0.3343 | 0.9287 |
| 217 | 0.3395 | 0.9329 |
| 218 | 0.3448 | 0.9373 |
| 219 | 0.3501 | 0.9414 |
| 220 | 0.3554 | 0.9456 |
| 221 | 0.3608 | 0.9500 |
| 222 | 0.3663 | 0.9543 |
| 223 | 0.3718 | 0.9587 |
| 224 | 0.3774 | 0.9631 |
| 225 | 0.3831 | 0.9676 |
| 226 | 0.3888 | 0.9720 |
| 227 | 0.3945 | 0.9766 |
| 228 | 0.4004 | 0.9811 |
| 229 | 0.4063 | 0.9857 |
| 230 | 0.4122 | 0.9903 |
| 231 | 0.4182 | 0.9950 |
| 232 | 0.4243 | 0.9997 |
| 233 | 0.4305 | 1.0044 |
| 234 | 0.4367 | 1.0092 |
| 235 | 0.4430 | 1.0140 |
| 236 | 0.4493 | 1.0188 |
| 237 | 0.4558 | 1.0237 |
| 238 | 0.4622 | 1.0286 |
| 239 | 0.4688 | 1.0335 |
| 240 | 0.4755 | 1.0385 |
| 241 | 0.4822 | 1.0436 |
| 242 | 0.4890 | 1.0486 |
| 243 | 0.4958 | 1.0537 |
| 244 | 0.5028 | 1.0589 |
| 245 | 0.5098 | 1.0640 |
| 246 | 0.5169 | 1.0693 |
| 247 | 0.5240 | 1.0745 |
| 248 | 0.5313 | 1.0798 |
| 249 | 0.5386 | 1.0851 |
| 250 | 0.5461 | 1.0905 |
| 251 | 0.5536 | 1.0959 |

TABLE 3-continued

| Point # | X | Y |
|---|---|---|
| 252 | 0.5612 | 1.1014 |
| 253 | 0.5688 | 1.1069 |
| 254 | 0.5766 | 1.1124 |
| 255 | 0.5844 | 1.1180 |
| 256 | 0.5924 | 1.1236 |
| 257 | 0.6004 | 1.1293 |
| 258 | 0.6085 | 1.1350 |
| 259 | 0.6167 | 1.1407 |
| 260 | 0.6209 | 1.1436 |
| 261 | 0.6250 | 1.1465 |
| 262 | 0.6292 | 1.1494 |
| 263 | 0.6334 | 1.1523 |
| 264 | 0.6377 | 1.1552 |
| 265 | 0.6419 | 1.1582 |
| 266 | 0.6462 | 1.1611 |
| 267 | 0.6505 | 1.1641 |
| 268 | 0.6549 | 1.1670 |
| 269 | 0.6592 | 1.1700 |
| 270 | 0.6636 | 1.1730 |
| 271 | 0.6680 | 1.1760 |
| 272 | 0.6725 | 1.1790 |
| 273 | 0.6769 | 1.1820 |
| 274 | 0.6814 | 1.1851 |
| 275 | 0.6859 | 1.1881 |
| 276 | 0.6905 | 1.1912 |
| 277 | 0.6950 | 1.1942 |
| 278 | 0.6996 | 1.1973 |
| 279 | 0.7042 | 1.2004 |
| 280 | 0.7089 | 1.2035 |
| 281 | 0.7136 | 1.2066 |
| 282 | 0.7183 | 1.2098 |
| 283 | 0.7230 | 1.2129 |
| 284 | 0.7278 | 1.2161 |
| 285 | 0.7326 | 1.2193 |
| 286 | 0.7374 | 1.2225 |
| 287 | 0.7423 | 1.2258 |
| 288 | 0.7472 | 1.2290 |
| 289 | 0.7522 | 1.2323 |
| 290 | 0.7571 | 1.2356 |
| 291 | 0.7621 | 1.2389 |
| 292 | 0.7672 | 1.2422 |
| 293 | 0.7722 | 1.2455 |
| 294 | 0.7773 | 1.2489 |
| 295 | 0.7825 | 1.2523 |
| 296 | 0.7877 | 1.2557 |
| 297 | 0.7929 | 1.2591 |
| 298 | 0.7981 | 1.2625 |
| 299 | 0.8034 | 1.2660 |
| 300 | 0.8087 | 1.2695 |
| 301 | 0.8141 | 1.2730 |
| 302 | 0.8195 | 1.2765 |
| 303 | 0.8249 | 1.2800 |
| 304 | 0.8304 | 1.2836 |
| 305 | 0.8359 | 1.2872 |
| 306 | 0.8414 | 1.2908 |
| 307 | 0.8470 | 1.2944 |
| 308 | 0.8526 | 1.2981 |
| 309 | 0.8583 | 1.3017 |
| 310 | 0.8640 | 1.3054 |
| 311 | 0.8697 | 1.3091 |
| 312 | 0.8755 | 1.3128 |
| 313 | 0.8813 | 1.3166 |
| 314 | 0.8872 | 1.3204 |
| 315 | 0.8931 | 1.3242 |
| 316 | 0.8991 | 1.3280 |
| 317 | 0.9051 | 1.3318 |
| 318 | 0.9111 | 1.3357 |
| 319 | 0.9172 | 1.3396 |
| 320 | 0.9233 | 1.3435 |
| 321 | 0.9295 | 1.3474 |
| 322 | 0.9357 | 1.3514 |
| 323 | 0.9420 | 1.3554 |
| 324 | 0.9483 | 1.3594 |
| 325 | 0.9546 | 1.3634 |
| 326 | 0.9610 | 1.3675 |
| 327 | 0.9675 | 1.3723 |
| 328 | 0.9740 | 1.3756 |

TABLE 3-continued

| Point # | X | Y |
|---|---|---|
| 329 | 0.9805 | 1.3798 |
| 330 | 0.9871 | 1.3839 |
| 331 | 0.9937 | 1.3881 |
| 332 | 1.0004 | 1.3915 |
| 333 | 1.0072 | 1.3965 |
| 334 | 1.0140 | 1.4008 |
| 335 | 1.0208 | 1.4051 |
| 336 | 1.0277 | 1.4094 |
| 337 | 1.0346 | 1.4137 |
| 338 | 1.0416 | 1.4181 |
| 339 | 1.0487 | 1.4225 |
| 340 | 1.0558 | 1.4269 |
| 341 | 1.0630 | 1.4314 |
| 342 | 1.0702 | 1.4358 |
| 343 | 1.0775 | 1.4403 |
| 344 | 1.0848 | 1.4449 |
| 345 | 1.0922 | 1.4494 |
| 346 | 1.0996 | 1.4540 |
| 347 | 1.1071 | 1.4586 |
| 348 | 1.1147 | 1.4633 |
| 349 | 1.1223 | 1.4679 |
| 350 | 1.1299 | 1.4726 |
| 351 | 1.1377 | 1.4774 |
| 352 | 1.1455 | 1.4821 |
| 353 | 1.1533 | 1.4869 |
| 354 | 1.1612 | 1.4918 |
| 355 | 1.1692 | 1.4966 |
| 356 | 1.1773 | 1.5015 |
| 357 | 1.1854 | 1.5064 |
| 358 | 1.1935 | 1.5114 |
| 359 | 1.2018 | 1.5163 |
| 360 | 1.2101 | 1.5214 |
| 361 | 1.2184 | 1.5264 |
| 362 | 1.2269 | 1.5315 |
| 363 | 1.2354 | 1.5366 |
| 364 | 1.2440 | 1.5417 |
| 365 | 1.2526 | 1.5469 |
| 366 | 1.2613 | 1.5521 |
| 367 | 1.2701 | 1.5574 |
| 368 | 1.2789 | 1.5626 |
| 369 | 1.2879 | 1.5680 |
| 370 | 1.2969 | 1.5733 |
| 371 | 1.3059 | 1.5787 |
| 372 | 1.3151 | 1.5841 |
| 373 | 1.3243 | 1.5896 |
| 374 | 1.3336 | 1.5950 |
| 375 | 1.3430 | 1.6006 |
| 376 | 1.3524 | 1.6061 |
| 377 | 1.3620 | 1.6117 |
| 378 | 1.3716 | 1.6174 |
| 379 | 1.3813 | 1.6230 |
| 380 | 1.3910 | 1.6288 |
| 381 | 1.4009 | 1.6345 |
| 382 | 1.4108 | 1.6403 |
| 383 | 1.4208 | 1.6461 |
| 384 | 1.4309 | 1.6520 |
| 385 | 1.4411 | 1.6579 |
| 386 | 1.4514 | 1.6638 |
| 387 | 1.4618 | 1.6698 |
| 388 | 1.4722 | 1.6758 |
| 389 | 1.4827 | 1.6819 |
| 390 | 1.4934 | 1.6880 |
| 400 | 1.5041 | 1.6942 |
| 401 | 1.5149 | 1.7003 |
| 402 | 1.5258 | 1.7066 |
| 403 | 1.5368 | 1.7128 |
| 404 | 1.5479 | 1.7192 |
| 405 | 1.5591 | 1.7255 |
| 406 | 1.5703 | 1.7319 |
| 407 | 1.5817 | 1.7384 |
| 408 | 1.5932 | 1.7448 |
| 409 | 1.6048 | 1.7514 |
| 410 | 1.6165 | 1.7579 |
| 411 | 1.6282 | 1.7646 |
| 412 | 1.6401 | 3.7712 |
| 413 | 1.6521 | 1.7779 |
| 414 | 1.6642 | 1.7847 |

TABLE 3-continued

| Point # | X | Y |
|---|---|---|
| 415 | 1.6764 | 1.7915 |
| 416 | 1.6887 | 1.7983 |
| 417 | 1.7011 | 1.8052 |
| 418 | 1.7136 | 1.8122 |
| 419 | 1.7263 | 1.8192 |
| 420 | 1.7390 | 1.8262 |
| 421 | 1.7519 | 1.8333 |
| 422 | 1.7649 | 1.8404 |
| 423 | 1.7779 | 1.8476 |
| 424 | 1.7911 | 1.8549 |
| 425 | 1.8045 | 1.8621 |
| 426 | 1.8179 | 1.8695 |
| 427 | 1.8315 | 1.8769 |
| 428 | 1.8452 | 1.8843 |
| 429 | 1.8590 | 1.8918 |
| 430 | 1.8729 | 1.8993 |
| 431 | 1.8870 | 1.9069 |
| 432 | 1.9012 | 1.9145 |
| 433 | 1.9155 | 1.9222 |
| 434 | 1.9299 | 1.9300 |
| 435 | 1.9445 | 1.9378 |
| 436 | 1.9592 | 1.9456 |
| 437 | 1.9740 | 1.9535 |
| 438 | 1.9890 | 1.9615 |
| 439 | 2.0041 | 1.9695 |
| 440 | 2.0194 | 1.9776 |
| 441 | 2.0348 | 1.9857 |
| 442 | 2.0503 | 3.9939 |
| 443 | 2.0660 | 2.0021 |
| 444 | 2.0818 | 2.0140 |
| 445 | 2.0978 | 2.0188 |
| 446 | 2.1139 | 2.0272 |
| 447 | 2.1301 | 2.0357 |
| 448 | 2.1465 | 2.0442 |
| 449 | 2.1631 | 2.0528 |
| 450 | 2.1798 | 2.0614 |
| 451 | 2.1967 | 2.0701 |
| 452 | 2.2137 | 2.0789 |
| 453 | 2.2309 | 2.0877 |
| 454 | 2.2482 | 2.0966 |
| 455 | 2.2657 | 2.1055 |
| 456 | 2.2834 | 2.1145 |
| 457 | 2.3012 | 2.1236 |
| 458 | 2.3192 | 2.1327 |
| 459 | 2.3374 | 2.1419 |
| 460 | 2.3557 | 2.1511 |
| 461 | 2.3742 | 2.1604 |
| 462 | 2.3929 | 2.1698 |
| 463 | 2.4117 | 2.1792 |
| 464 | 2.4308 | 2.1887 |
| 465 | 2.4500 | 2.1983 |
| 466 | 2.4693 | 2.2079 |
| 467 | 2.4889 | 2.2176 |
| 468 | 2.5087 | 2.2273 |
| 469 | 2.5286 | 2.2372 |
| 470 | 2.5487 | 2.2470 |
| 471 | 2.5690 | 2.2570 |
| 472 | 2.5895 | 2.2670 |
| 473 | 2.6102 | 2.2771 |
| 474 | 2.6311 | 2.2872 |
| 475 | 2.6521 | 2.2974 |
| 476 | 2.6734 | 2.3077 |
| 477 | 2.6949 | 2.3180 |
| 478 | 2.7165 | 2.3284 |
| 479 | 2.7384 | 2.3389 |
| 480 | 2.7605 | 2.3494 |
| 481 | 2.7872 | 2.3600 |
| 482 | 2.8054 | 2.3707 |
| 483 | 2.8279 | 2.3184 |
| 484 | 2.8508 | 2.3922 |
| 485 | 2.8704 | 2.4031 |
| 486 | 2.8973 | 2.4140 |
| 487 | 2.9208 | 2.4250 |
| 488 | 2.9446 | 2.4360 |
| 489 | 2.9686 | 2.4472 |
| 490 | 2.9928 | 2.4584 |
| 491 | 3.0172 | 2.4696 |

TABLE 3-continued

| Point # | X | Y |
|---|---|---|
| 492 | 3.0419 | 2.4809 |
| 493 | 3.0668 | 2.4923 |
| 494 | 3.0919 | 2.5038 |
| 495 | 3.1172 | 2.5153 |
| 496 | 3.1428 | 2.5269 |
| 497 | 3.1686 | 2.5386 |
| 498 | 3.1946 | 2.5503 |
| 499 | 3.2209 | 2.5621 |
| 500 | 3.2474 | 2.5739 |
| 501 | 3.2741 | 2.5858 |
| 502 | 3.3011 | 2.5978 |
| 503 | 3.3284 | 2.6098 |
| 504 | 3.3558 | 2.6219 |
| 505 | 3.3836 | 2.6341 |
| 506 | 3.4115 | 2.6463 |
| 507 | 3.4397 | 2.6586 |
| 508 | 3.4682 | 2.6709 |
| 509 | 3.4969 | 2.6833 |
| 510 | 3.5259 | 2.6958 |
| 511 | 3.5551 | 2.7083 |
| 512 | 3.5845 | 2.7209 |
| 513 | 3.6143 | 2.7335 |
| 514 | 3.6442 | 2.7462 |
| 515 | 3.6745 | 2.7589 |
| 516 | 3.7049 | 2.7717 |
| 517 | 3.7357 | 2.7845 |
| 518 | 3.7667 | 2.7974 |
| 519 | 3.7980 | 2.8104 |
| 520 | 3.8295 | 2.8234 |
| 521 | 3.8613 | 2.8364 |
| 522 | 3.8933 | 2.8495 |
| 523 | 3.9256 | 2.8626 |
| 524 | 3.9581 | 2.8758 |
| 525 | 3.9910 | 2.8890 |
| 526 | 4.0241 | 2.9023 |
| 527 | 4.0574 | 2.9156 |
| 528 | 4.0910 | 2.9289 |
| 529 | 4.1249 | 2.9423 |
| 530 | 4.1590 | 2.9557 |
| 531 | 4.1934 | 2.9691 |
| 532 | 4.2280 | 2.9862 |
| 533 | 4.2629 | 2.9961 |
| 534 | 4.2980 | 3.0096 |
| 535 | 4.3335 | 3.0231 |
| 536 | 4.3691 | 3.0367 |
| 537 | 4.4050 | 3.0502 |
| 538 | 4.4412 | 3.0638 |
| 539 | 4.5143 | 6.0910 |
| 540 | 4.5512 | 3.1046 |
| 541 | 4.5883 | 3.1183 |
| 542 | 4.6257 | 3.1319 |
| 543 | 4.6633 | 3.1455 |
| 544 | 4.7012 | 3.1591 |
| 545 | 4.7393 | 3.1727 |
| 546 | 4.7776 | 3.1863 |
| 547 | 4.8162 | 3.1999 |
| 548 | 4.8550 | 3.2135 |
| 549 | 4.8939 | 3.2270 |
| 550 | 4.9332 | 3.2405 |
| 551 | 4.9726 | 3.2540 |
| 552 | 5.0122 | 3.2674 |
| 553 | 5.0520 | 3.2808 |
| 554 | 5.0920 | 3.2942 |
| 555 | 5.1322 | 3.2942 |
| 556 | 5.1322 | 3.3075 |
| 557 | 5.1726 | 3.3208 |
| 558 | 5.2132 | 3.3340 |
| 559 | 5.2540 | 3.3472 |
| 560 | 5.2949 | 3.3602 |
| 561 | 5.3359 | 3.3733 |
| 562 | 5.3772 | 3.3862 |
| 563 | 5.4185 | 3.3991 |
| 564 | 5.4600 | 3.4118 |
| 565 | 5.5017 | 3.4245 |
| 566 | 5.5435 | 3.4371 |
| 567 | 5.5853 | 3.4496 |
| 568 | 5.6273 | 3.4620 |

TABLE 3-continued

| Point # | X | Y |
|---|---|---|
| 569 | 5.6694 | 3.4742 |
| 570 | 5.7116 | 3.4864 |
| 571 | 5.7538 | 3.4984 |
| 572 | 5.7961 | 3.5103 |
| 573 | 5.8385 | 3.5220 |
| 574 | 5.8809 | 3.5336 |
| 575 | 5.9234 | 3.5451 |
| 576 | 5.9658 | 3.5564 |
| 577 | 6.0083 | 3.5675 |
| 578 | 6.0508 | 3.5785 |
| 579 | 6.0933 | 3.5892 |
| 580 | 6.1357 | 3.59984 |
| 581 | 6.1782 | 3.6102 |
| 582 | 6.2205 | 3.6204 |
| 583 | 6.2628 | 3.6305 |
| 584 | 6.3051 | 3.6402 |
| 585 | 6.3472 | 3.6498 |
| 586 | 6.3892 | 3.6592 |
| 587 | 6.4312 | 3.6683 |
| 588 | 6.4729 | 3.6858 |
| 589 | 6.5560 | 3.6941 |
| 590 | 6.5973 | 3.7022 |
| 591 | 6.6384 | 3.7101 |
| 592 | 6.6792 | 3.7176 |
| 593 | 6.7199 | 3.7249 |
| 594 | 6.7603 | 3.7319 |
| 595 | 6.8004 | 3.7385 |
| 596 | 6.8402 | 3.7449 |
| 597 | 6.8798 | 3.7510 |
| 598 | 6.9190 | 3.7567 |
| 599 | 6.9579 | 3.7621 |
| 600 | 6.9964 | 3.7672 |
| 601 | 7.0346 | 3.7719 |
| 602 | 7.0724 | 3.7763 |
| 603 | 7.1098 | 3.7803 |
| 604 | 7.1467 | 3.7840 |
| 605 | 7.1467 | 3.7840 |
| 606 | 7.1833 | 3.7873 |
| 607 | 7.2193 | 3.7902 |
| 608 | 7.2549 | 3.7928 |
| 609 | 7.2900 | 3.7949 |
| 610 | 7.3246 | 3.7967 |
| 611 | 7.3586 | 3.7981 |
| 612 | 7.3921 | 3.7990 |
| 613 | 7.4251 | 3.7996 |
| 614 | 7.4574 | 3.7997 |

TABLE 4

Intensity distribution

| | | | | | | | | | | |
|---|---|---|---|---|---|---|---|---|---|---|
| 93.3 | 94.5 | 95.5 | 96.2 | 96.6 | 97.1 | 96.6 | 96.2 | 95.5 | 94.5 | 93.3 |
| 93.5 | 95.3 | 96.4 | 96.8 | 97.9 | 97.9 | 97.9 | 96.8 | 96.4 | 95.3 | 93.5 |
| 94.7 | 96.2 | 97.1 | 97.9 | 98.6 | 98.9 | 98.6 | 97.9 | 97.1 | 96.2 | 94.7 |
| 95.8 | 97.2 | 98.3 | 99.2 | 100.1 | 100.4 | 100.1 | 99.2 | 98.3 | 97.2 | 95.8 |
| 95.8 | 97.35 | 98.8 | 99.6 | 100 | 100.4 | 100 | 99.6 | 98.8 | 97.35 | 95.8 |
| 94.6 | 96.3 | 97.6 | 98.1 | 98.9 | 99.3 | 98.9 | 98.1 | 97.6 | 96.3 | 94.6 |
| 95.4 | 97.1 | 98.3 | 99.2 | 100 | 100.4 | 100 | 99.2 | 98.3 | 97.1 | 95.4 |
| 96.2 | 97.9 | 99 | 99.6 | 100.4 | 100.7 | 100.4 | 99.6 | 99 | 97.9 | 96.2 |
| 95.9 | 97.7 | 98.6 | 99.3 | 100.2 | 100.7 | 100.2 | 99.3 | 98.6 | 97.7 | 95.9 |
| 95.9 | 97.7 | 98.6 | 99.3 | 100 | 100.6 | 100 | 99.3 | 98.6 | 97.7 | 95.9 |
| 96.1 | 97.8 | 99 | 99.6 | 100.4 | 100.9 | 100.4 | 99.6 | 99 | 97.8 | 96.1 |
| 95.4 | 97.1 | 98.3 | 99.2 | 100 | 100.4 | 100 | 99.2 | 98.3 | 97.1 | 95.4 |
| 94.1 | 95.8 | 97.1 | 97.5 | 98.3 | 98.8 | 98.3 | 97.5 | 97.1 | 95.8 | 94.1 |
| 95.5 | 97.2 | 98.6 | 99.2 | 99.7 | 100.2 | 99.7 | 99.2 | 98.6 | 97.2 | 95.5 |
| 95.9 | 97.5 | 98.8 | 99.6 | 100.4 | 100.4 | 100.4 | 99.6 | 98.8 | 97.5 | 95.9 |
| 94.8 | 96.2 | 97.1 | 97.9 | 98.8 | 99 | 98.8 | 97.9 | 97.1 | 96.2 | 94.8 |
| 93.3 | 95.1 | 96.2 | 96.6 | 97.5 | 97.6 | 97.5 | 96.6 | 96.2 | 95.1 | 93.3 |
| 93.7 | 95 | 95.9 | 96.6 | 97.1 | 97.5 | 97.1 | 96.6 | 95.9 | 95 | 93.7 |

The invention has been described in detail with particular reference to the preferred embodiment, but it will be understood that variations and modifications can be effected within the spirit and scope of the invention, It is noted that the flash device described herein could be used in other applications and that the color filter arrays can be used in applications other than liquid crystal displays.

What is claimed is:

1. A flash device for transferring dye from a radiation-absorbing dye carrier to a receiver element, said flash device comprising:
   (i) a flash lamp providing a high energy flash of light;
   (ii) a reflector directing the light from said flash towards the receiver element;
   (iii) a support means for supporting the radiation-absorbing dye carrier between said reflector and the receiver element; and
   (iv) a micro-optics array located between said reflector and the radiation-absorbing dye carrier, said micro-optics array including a plurality of miniature lenses having optical power and located so as to concentrate the light directed by said reflector on the dye carrier.

2. A flash device according to claim 1, wherein said miniature lenslets of said micro-optics array focus the light directed by said reflector proximate to the radiation-absorbing dye carrier.

3. A flash device according to claim 1, wherein said plurality of miniature lenses is adapted to focus light rays to a plurality of focal points.

4. A flash device according to claim 3, wherein said lens elements include refractive lens elements.

5. A flash device for transferring dye from a radiation-absorbing dye carrier to a receiver element, said flash device comprising:
   (i) a flash lamp providing a high energy flash of light;
   (ii) a reflector directing the light from said flash towards the receiver element;
   (iii) a support means for supporting the radiation-absorbing dye carrier between said reflector and the receiver element; and
   (iv) a micro-optics array located between said reflector and the radiation-absorbing dye carrier, said micro-optics array including a plurality of miniature lenses concentrating the light directed by said reflector on the dye carrier, said plurality of miniature lenses being adapted to focus light rays to a plurality of focal points, wherein said plurality of miniature lenses include diffractive lens elements.

6. A flash device for transferring dye from a radiation-absorbing dye carrier to a receiver element, said flash device comprising:

(i) a flash lamp providing a high energy flash of light;

(ii) a reflector directing the light from said flash towards the receiver element, (iii) a support means for supporting the radiation-absorbing dye carrier between said reflector and the receiver element; and (iv) a micro-optics array located between said reflector and the radiation-absorbing dye carrier, said micro-optics array including a plurality of miniature lens elements concentrate the light directed by said reflector on the dye carrier, wherein said plurality of miniature lens elements are adapted to focus light rays to a plurality of focal points, and wherein said miniature lens elements have both a refractive and a diffractive optical power.

7. A color filter array manufacturing system comprising:

(i) a flash lamp providing a high energy flash of light;

(ii) a reflector directing the light from said flash towards a receiver element;

(iii) a support means for supporting the radiation-absorbing dye carrier between said reflector and the receiver element;

(iv) a micro-optics array located between said reflector and the dye carrier, said micro-optics array including a plurality of miniature lenses concentrating the light directed by said reflector on the dye carrier; and (v) a positioning system, said positioning system positioning the receiver element in a different position from a previous position of the receiver element prior to transferring an additional color dye onto the receiver element.

8. A color filter array manufacturing system comprising:

(i) a flash lamp providing a high energy flash of light;

(ii) a reflector directing the light from said flash towards a receiver element;

(iii) a support means for supporting the radiation-absorbing dye carrier between said reflector and the receiver element;

(iv) a micro-optics array located between said reflector and the dye carrier, said micro-optics array including a plurality of miniature lenses with optical power so as to concentrate the light directed by said reflector on the dye carrier; and (v) a positioning system, said positioning system positioning the micro-optic array in a slightly different position with respect to the receiver element, prior to transferring an additional color dye onto the receiver element.

* * * * *